US012321174B2

(12) United States Patent
Zheng et al.

(10) Patent No.: US 12,321,174 B2
(45) Date of Patent: Jun. 3, 2025

(54) METHOD AND APPARATUS FOR CONTROLLING MOTION OF LEGGED ROBOT, DEVICE, AND MEDIUM

(71) Applicant: TENCENT TECHNOLOGY (SHENZHEN) COMPANY LIMITED, Shenzhen (CN)

(72) Inventors: Yu Zheng, Shenzhen (CN); Xinyang Jiang, Shenzhen (CN); Wanchao Chi, Shenzhen (CN); Yonggen Ling, Shenzhen (CN); Shenghao Zhang, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 337 days.

(21) Appl. No.: 17/954,028

(22) Filed: Sep. 27, 2022

(65) Prior Publication Data

US 2023/0030054 A1 Feb. 2, 2023

Related U.S. Application Data

(63) Continuation of application No. PCT/CN2021/124524, filed on Oct. 19, 2021.

(30) Foreign Application Priority Data

Oct. 26, 2020 (CN) .......................... 202011154824.6

(51) Int. Cl.
*G05D 1/00* (2024.01)
*B62D 57/032* (2006.01)
(52) U.S. Cl.
CPC ......... *G05D 1/0088* (2013.01); *B62D 57/032* (2013.01)

(58) Field of Classification Search
CPC ... G05D 1/0088; G05D 1/0891; B62D 57/032
See application file for complete search history.

(56) References Cited

U.S. PATENT DOCUMENTS 9,594,377 B1 3/2017 Perkins et al.
2011/0301756 A1* 12/2011 Yoshiike .............. B62D 57/032
901/1
(Continued)

FOREIGN PATENT DOCUMENTS

CN 102749919 A 10/2012
CN 104570732 A 4/2015
(Continued)

OTHER PUBLICATIONS

The World Intellectual Property Organization (WIPO) International Search Report for PCT/CN2021/123953 Jan. 19, 2022 7 Pages (including translation).

(Continued)

*Primary Examiner* — Sohana Tanju Khayer
(74) *Attorney, Agent, or Firm* — ANOVA LAW GROUP, PLLC

(57) ABSTRACT

A method for controlling motion of a legged robot includes: determining, according to state data of the legged robot at a start moment in a preset period, a candidate landing point of each foot in the preset period; determining, according to the state data at the start moment and the candidate landing point of each foot, a first correlation between a centroid position change parameter, a step duty ratio, a candidate landing point, and a foot contact force; determining, under a constraint of a constraint condition set, a target centroid position change parameter, a target step duty ratio, and a target landing point satisfying the first correlation; and controlling, according to the target centroid position change parameter, (Continued)

the target step duty ratio, and the target landing point, motion of the legged robot in the preset period.

18 Claims, 6 Drawing Sheets

(56) References Cited

U.S. PATENT DOCUMENTS

| | | | |
|---|---|---|---|
| 2013/0158712 A1* | 6/2013 | Lee | G05B 19/04 |
| | | | 901/1 |
| 2019/0070729 A1* | 3/2019 | Kamioka | B62D 57/032 |
| 2020/0033860 A1 | 1/2020 | Blankespoor et al. | |
| 2020/0324412 A1* | 10/2020 | Whitman | B25J 9/1666 |
| 2021/0107163 A1* | 4/2021 | Klingensmith | B25J 9/162 |
| 2021/0237265 A1* | 8/2021 | Zhu | B25J 9/1602 |
| 2021/0283001 A1* | 9/2021 | Von Zitzewitz | A61H 3/008 |
| 2021/0291373 A1* | 9/2021 | Nelson | B62D 57/032 |
| 2021/0309310 A1* | 10/2021 | Fay | B25J 9/1664 |
| 2021/0323618 A1* | 10/2021 | Komoroski | G06F 18/23 |
| 2022/0011772 A1* | 1/2022 | Xiong | G05D 1/0212 |
| 2023/0018155 A1* | 1/2023 | Takasugi | B62D 57/032 |
| 2023/0264765 A1* | 8/2023 | Xie | B62D 57/032 |
| | | | 700/256 |
| 2023/0355458 A1* | 11/2023 | Petriaux | A61H 3/00 |
| 2024/0066691 A1* | 2/2024 | Kamikawa | B25J 15/0616 |

FOREIGN PATENT DOCUMENTS

| | | |
|---|---|---|
| CN | 103092196 A | 3/2016 |
| CN | 106695791 A | 5/2017 |
| CN | 108772836 A | 11/2018 |
| CN | 108983804 A | 12/2018 |
| CN | 107065867 B | 5/2019 |
| CN | 111506094 A | 8/2020 |
| CN | 111766885 A | 10/2020 |
| IN | 108931988 A | 12/2018 |
| IN | 110764415 A | 2/2020 |

OTHER PUBLICATIONS

Wieber P B. "Holonomy and nonholonomy in the dynamics of articulated motion",2016, p. 411-425. Fast motions in biomechanics and robotics. Springer, Berlin, Heidelberg.

The European Patent Office (EPO) The Extended European Search Report for 21884975.0 Sep. 18, 2023 10 Pages.

Buchli, Jonas, et al. "Compliant quadruped locomotion over rough terrain." 2009 IEEE/RSJ international conference on Intelligent robots and systems. IEEE, 2009. 7 pages.

* cited by examiner

METHOD AND APPARATUS FOR CONTROLLING MOTION OF LEGGED ROBOT, DEVICE, AND MEDIUM

CROSS-REFERENCES TO RELATED APPLICATIONS

This application is a continuation application of PCT Patent Application No. PCT/CN2021/124524, entitled "METHOD AND APPARATUS FOR CONTROLLING MOVEMENT OF LEGGED ROBOT, AND DEVICE, MEDIUM, AND PROGRAM" and filed on Oct. 19, 2021, which claims priority to Chinese Patent Application No. 202011154824.6, entitled "METHOD AND APPARATUS FOR CONTROLLING MOTION OF LEGGED ROBOT, DEVICE, MEDIUM, AND PROGRAM" filed with the China National Intellectual Property Administration on Oct. 26, 2020, the entire contents of both of which are incorporated herein by reference.

FIELD OF THE TECHNOLOGY

The present disclosure relates to the field of robot technologies, and in particular to a method and an apparatus for controlling motion of a legged robot, a device, a medium, and a program.

BACKGROUND OF THE DISCLOSURE

In the field of robot control, it is usually first to determine a centroid motion trajectory of a legged robot, and then to determine a motion control parameter of the legged robot according to the centroid motion trajectory.

In determining the centroid motion trajectory in the related art, state data of the legged robot mostly uses a fixed value to calculate the centroid motion trajectory. As a result, the calculated motion control parameter is often not adaptable to the environment, resulting in poor performance of the legged robot in adapting to the environment when the legged robot is controlled according to the motion control parameter.

SUMMARY

Embodiments of the present disclosure provide a method and an apparatus for controlling motion of a legged robot, a device, a medium, and a program to improve the adaptability of the legged robot motion to the environment.

In one aspect, a method for controlling motion of a legged robot is provided, which is executed by an electronic device, the legged robot includes a plurality of feet, and the method includes: determining, according to state data of the legged robot at a starting moment in a preset period, a candidate landing point of each foot in the preset period; determining, according to the state data at the starting moment and the candidate landing point of each foot, a first correlation between a centroid position change parameter, a step duty ratio, a candidate landing point, and a foot contact force; determining, under a constraint of a constraint condition set, a target centroid position change parameter, a target step duty ratio, and a target landing point satisfying the first correlation; and controlling, according to the target centroid position change parameter, the target step duty ratio, and the target landing point, motion of the legged robot in the preset period.

In another aspect, an apparatus for controlling motion of a legged robot is provided, the legged robot includes a plurality of feet, and the apparatus includes: a candidate landing point determining module, configured to determine, according to state data of the legged robot at a starting moment in a preset period, a candidate landing point of each foot in the preset period; a correlation determining module, configured to determine, according to the state data at the starting moment and the candidate landing point of each foot, a first correlation between a centroid position change parameter, a step duty ratio, a candidate landing point, and a foot contact force; a target determining module, configured to determine, under a constraint of a constraint condition set, a target centroid position change parameter, a target step duty ratio, and a target landing point satisfying the first correlation; and a motion control module, configured to control, according to the target centroid position change parameter, the target step duty ratio, and the target landing point, motion of the legged robot in the preset period.

An embodiment of the present disclosure provides an electronic device, including: a memory; and at least one processor, connected to the memory; the memory storing instructions executable by the at least one processor, and the at least one processor implementing the method for controlling motion of a legged robot by executing the instructions stored in the memory.

An embodiment of the present disclosure provides a non-transitory storage medium, and the storage medium stores computer instructions, the computer instructions, when run on a computer, causing the computer to execute the method for controlling motion of a legged robot.

DESCRIPTION OF EMBODIMENTS

Figure 1:
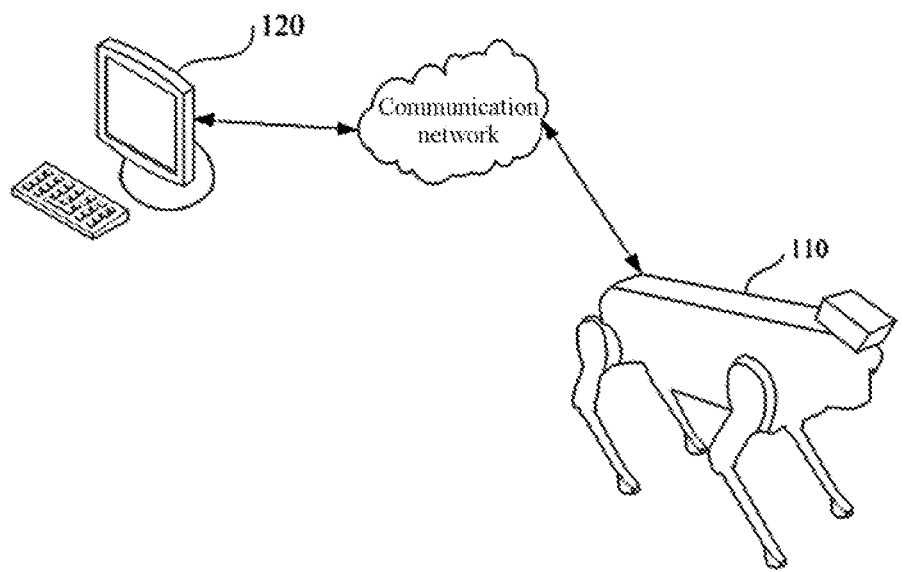
FIG. 1 is an example diagram of an application scenario of a method for controlling motion of a legged robot according to an embodiment of the present disclosure.

To make the technical solution according to an embodiment of the present disclosure better understood, the following describes in detail with reference to the accompanying drawings of the specification and specific implementations.

In order to facilitate a person skilled in the art to better understand the technical solution of the present disclosure, the terms involved in the present disclosure are introduced below.

Robot: including various types of machines that simulate human behavior or ideologically simulate other organisms (such as robot dogs and robot cats). Certain computer programs are also referred to as robots in a broad sense. In contemporary industry, a robot refers to an artificial robot that can automatically perform tasks to replace or assist human work. The robot may be an electromechanical device, or be controlled by a computer program or an electronic circuit.

Legged robot: generally referring to a robot with a foot. The legged robot may be configured with one or more legs, and each leg may be configured with one or more joints, usually one leg corresponds to three joints, and each leg corresponds to a foot. For example, a two-legged robot, a four-legged robot, or a six-legged robot. For example, the four-legged robot is a robot dog. Since the legged robot may include a plurality of feet, and the feet that land at different times may be different, the respective feet of the legged robot may be represented as a first foot, a second foot, . . . , an i-th foot, and the like, for ease of distinction.

Preset period: referring to a time length of each motion of the robot. A length of the preset period may be arbitrary and may be set according to programming needs. The preset period includes a plurality of moments, and in the present disclosure, a moment selected from the plurality of moments in the preset period is referred to as a sampling moment. During a motion process of the legged robot, the legged robot is programmed from A to B, a total time required from A to B point may be divided into a plurality of preset periods, and the process of controlling the legged robot from A to B is specifically divided into controlling the legged robot to complete motion corresponding to each preset period in sequence.

Start moment: referring to a moment at which the robot starts to move in the preset period. The start moment may, for example, be counted from 0. A position of the robot at the start moment may be referred to as a starting position.

Termination moment: also referred to as an end moment, which refers to a moment at which the motion ends in the preset period, that is, a moment at which the robot stops motion along the preset period. A position of the robot at the termination moment may be referred to as a termination position or an end position.

State data: including centroid state data of the robot, and further including a pose, a landing point, a foot position, and the like of the robot. Since the state data is related to a current state of the robot, state data of the robot at different times is different.

Centroid state data: referring to data used to describe a change of a centroid state of the robot, specifically including one or more of a centroid position, a centroid velocity, and a centroid acceleration of the robot. The centroid position is a central position of a mass of the robot, and is used to describe a position of the robot. The centroid position changes when the robot is in different motion states. The centroid velocity may be obtained by solving a first derivative of the centroid position relative to time, and the centroid acceleration may be obtained by solving a second derivative of the centroid position relative to time. For ease of description, a centroid position at the start moment may be referred to as a start centroid position, a centroid velocity at the start moment may be referred to as a start centroid velocity, and a centroid acceleration at the start moment may be referred to as a start centroid acceleration. Similarly, a centroid position at the end moment may be referred to as an end centroid position, a centroid velocity at the end moment may be referred to as an end centroid velocity, and a centroid acceleration at the end moment may be referred to as an end centroid acceleration.

Given pose: during the motion process, the robot has a different pose for each sampling moment. Before controlling the robot to move, a pose of the robot at the start moment and a pose of the robot at the end moment may be set, and the set pose is the given pose. The given pose may be represented by a matrix, a vector, a plurality of coordinate values, or the like.

Target pose or expected pose: referring to a pose of the robot at each moment determined according to a landing point of the robot. Since the pose at the start moment is known, an actual pose at the start moment may be regarded as the target pose at the start moment, and may also be regarded as the given pose at the start moment.

Landing point: referring to a position where the foot of the robot is in contact with a contact force, which is used to refer to a landing point of the robot in general. The landing point may be a start landing point or a candidate landing point. When the candidate landing point is selected as the landing point of the foot, the candidate landing point may also be regarded as a target landing point. The start landing point refers to a landing point of the legged robot at the start moment.

Candidate landing point: referring to a determined position where the foot may be in contact with a contact surface when the foot of the robot is in contact with the contact surface. Usually, one or more candidate landing points are determined for each landing foot of the robot according to a motion environment of the robot. For example, candidate landing points of a landing i-th leg include A, B, and C. A landing foot, as used herein, may refer to a foot of the robot that is going to land on a contact surface.

Target landing point: referring to the selected candidate landing point that are eventually determined from the candidate landing points. In an embodiment of the present disclosure, the selection of the target landing point may actually be represented by a set of binary numbers $\beta_{ij}$. After determining a value of the $\beta_{ij}$, the selected candidate landing point is determined correspondingly, and a value of the target landing point can be obtained.

Centroid position change parameter: the centroid position change parameter is used to describe a parameter showing a change of the centroid position over time. The centroid position change parameter is represented in the form of a matrix, in the form of a vector, or the like. The centroid position change parameter and a time interval can jointly represent a centroid position at a particular moment, and the time interval refers to a time difference between the particular moment and the start moment.

Contact surface: referring to a surface where the foot of the robot is in contact with the environment, the contact surface may be, for example, a ground surface, or other supports being in contact with the foot. The corresponding contact surface of the legged robot may be different due to other circumstances, such as an uneven road surface. In an embodiment of the present disclosure, description is made using that the foot is in contact with the contact surface as an example, but the method according to the embodiment of the present disclosure is still applicable to a case that other portions of the legged robot are in contact with the contact surface.

Centroid motion trajectory: also referred to as a centroid position motion trajectory, or a centroid trajectory, which is used to describe centroid positions of the robot at different moments. The centroid motion trajectory is formed by the centroid positions of the robot at different moments.

A quantity of contact points: referring to a quantity of the feet of the robot being in contact with the contact surface. Certainly, the quantities of the feet of the robot being in contact with the contact surface at different moments may or may not be the same, and thus a quantity of contact points may change over time.

Step timing: when and which leg the robot takes, specifically including a step time and a step order. The step time is used to describe when the robot steps a leg during the preset period. The step order refers to an order in which the robot steps a leg during the preset period, for example, the robot first steps a left hind leg and then steps a right hind leg.

Foot contact force: referring to a contact force size between the foot of the robot and the contact surface. When the foot of the robot is not in contact with the contact surface, there is no foot contact force between the foot and the contact surface, or it may be understood that the foot contact force is 0.

Constraint condition set: used to constrain one or more of four variables of the centroid position change parameter, the step order, the landing point, and the foot contact force. The constraint condition set includes one or more constraint conditions. The constraint condition set in the embodiment of the present disclosure includes a constraint condition for constraining the step order, a spatial landing point constraint condition, a friction force constraint condition, and a contact force constraint condition. The spatial landing point constraint condition is used to constrain a landing point corresponding to the centroid position of the legged robot to be accessible to the foot of the legged robot. The spatial landing point constraint condition is used to constrain the centroid position change parameter, the step duty ratio, and the landing point of the robot. The friction force constraint condition is used to constrain a size of the friction force between the foot being in contact with the contact surface and the contact surface, to avoid slippage between the legged robot and the contact surface. The friction force constraint condition is specifically used to constrain the foot contact force to be in a friction cone. The friction cone is determined according to a normal vector at the candidate landing point of the legged robot and a friction coefficient between the landing foot and the contact surface. The foot contact force constraint condition is used to constrain a contact force of the foot contact force in a normal direction to be less than or equal to an upper limit of the contact force, to avoid an excessive acting force between the legged robot and the contact surface.

Target motion control parameter: referring to a parameter required for controlling the motion of the legged robot, specifically including a target/expected joint rotation angle of the legged robot at each sampling moment and a joint torque at each sampling moment.

Step duty ratio: referring to a ratio of a step time of a leg performing a step of the robot during the preset period to the preset period. The step duty ratios of any two legs performing a step are the same during the preset period.

Pose change angle parameter: including a pose change angle, a pose change angle velocity, and a pose change angle acceleration of the robot. The pose change angle may refer to a change angle of the robot from one pose to another pose. For example, the robot moves from a point A to a point B in a first pose, and the robot is also in the first pose at the point B, then the pose change angle of the robot is 0. The pose change angle velocity is obtained by solving a first derivative of the pose change angle relative to time, and the pose change angle acceleration is obtained by solving a second derivative of the pose change angle relative to time.

In addition, in the embodiments of the present disclosure, "a plurality of" refers to two or more, and "at least one" refers to one or more.

In order to improve the degree of matching between the generated motion control parameter and the environment, an embodiment of the present disclosure provides a method for controlling motion of a legged robot. The design idea of the method for controlling motion of a legged robot involved in the embodiment of the present disclosure is introduced below.

In the embodiment of the present disclosure, a plurality of candidate landing points corresponding to a foot of a legged robot are determined. A first correlation between a centroid position change parameter, a step duty ratio, a candidate landing point and a foot contact force is determined according to state data of the legged robot. A target centroid position change parameter, a target landing point, and a target step duty ratio of the legged robot are determined using the first correlation and a constraint condition set according to the plurality of candidate landing points. A centroid motion trajectory of the legged robot is determined according to the target centroid position change parameter and the target step duty ratio. A target motion control parameter is determined according to the centroid motion trajectory and the target landing point. The legged robot is controlled to move in a preset period using the target motion control parameter. In the embodiment of the present disclosure, in determining the target motion control parameter of the legged robot, the centroid position change parameter, the step duty ratio, the landing point, and other variables of the legged robot are all programmed according to an actual situation, so that the motion control parameter determined based on these variables can be more consistent with an actual motion of the legged robot and more consistent with an actual motion environment, thereby improving the adaptability between the motion control parameter and the environment, and also improving the adaptability of the motion of the legged robot to the environment. In addition, in the embodiment of the present disclosure, it is possible to automatically generate a centroid position and the step duty ratio of the legged robot, and to automatically select the landing point of the legged robot, which improves the intelligent degree of the legged robot.

Further, in the embodiment of the present disclosure, a mixed integer quadratic programming may be constructed according to the first correlation, the constraint condition set, and a cost function, and the target centroid position change parameter, the target landing point, and the target step duty ratio may be solved by a method for solving the mixed integer quadratic programming. If there is a solution of the mixed integer quadratic programming problem, it is inevitable that a global optimal solution can be solved. Therefore, by converting the solving of the target centroid position change parameter, the target landing point and the target step duty ratio into the mixed integer quadratic programming problem, the optimal target centroid position change parameter, target landing point and target step duty ratio can be solved.

Based on the above design ideas, an application scenario of the method for controlling motion of a legged robot in the embodiment of the present disclosure is introduced below.

The method for controlling motion of a legged robot is adapted to control various gaits of various types of legged robots in various environments. Various types of legged robots include a two-legged robot, a four-legged robot, and the like. Various environments include flat ground, uneven ground, slopes, stairs, and the like. Various gaits include bipedal walking, quadrupedal walking, quadrupedal trotting, random gaits, and the like.

With reference to FIG. 1, FIG. 1 is an application scenario diagram of the method for controlling motion of a legged robot, or an architecture diagram of a system for controlling motion of a legged robot. The architecture diagram includes a legged robot 110 and a control device 120. The following exemplarily introduces the interaction between the control device 120 and the legged robot 110.

In a possible case, the control device 120 and the legged robot 110 are two relatively independent devices. In this case, the communication between the legged robot 110 and the control device 120 is performed by wire or wireless. In FIG. 1, for example, the communication between the legged robot 110 and the control device 120 is implemented using a communication network.

Before controlling the legged robot 110 to move, the control device 120 may set state data of the legged robot 110 at a start moment according to an operation of a user or a task of the legged robot 110. Alternatively, the legged robot 110 may detect the state data at the start moment and upload the state data at the start moment to the control device 120. Alternatively, the control device 120 directly collects the state data of the legged robot 110 at the start moment.

Further, the control device 120 collects an image of the environment in which the legged robot 110 is currently located, or receives an environment image reported by the legged robot 110. The control device 120 determines, according to the environment image, a possible candidate landing point for a foot of the legged robot 110 that needs to land in a preset period. Certainly, there are many ways for the control device 120 to determine the candidate landing point, which are described in detail below.

The control device 120 determines a motion control parameter of the legged robot 110 according to the state data and the candidate landing point, and then controls the legged robot 110 to perform corresponding motion. The content of determining the motion control parameter is described below.

The control device 120 may be implemented by a server or a terminal, and the server includes, but is not limited to: an independent physical server, a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal is, for example, a mobile phone, a personal computer, a smart TV, or a portable tablet computer.

In another possible case, the control device 120 is part of the legged robot 110. In this case, the control device 120 may be arranged in a body of the legged robot 110, for example, the control device 120 is an internal processor in the legged robot 110, or the like.

Before the control device 120 controls the legged robot 110 to move, the control device 120 may receive a motion instruction from a host computer or operate according to an input of the user to obtain the motion instruction. The motion instruction may instruct the legged robot 110 to perform a certain task, or instruct a start moment and an end moment of the legged robot 110 in the preset period. The host computer may be any device that is wirelessly or wiredly connected to the control device 120, such as a terminal or a server.

Similarly, the control device 120 collects the state data of the legged robot 110. The control device 120 may determine a possible candidate landing point for each landing foot of the legged robot 110 according to an image of the environment in which the legged robot 110 is currently located. The control device 120 determines a target motion control parameter of the legged robot according to the state data and the candidate landing point, to control the legged robot 110 to move. The content of determining the target motion control parameter is described below.

Figure 2:
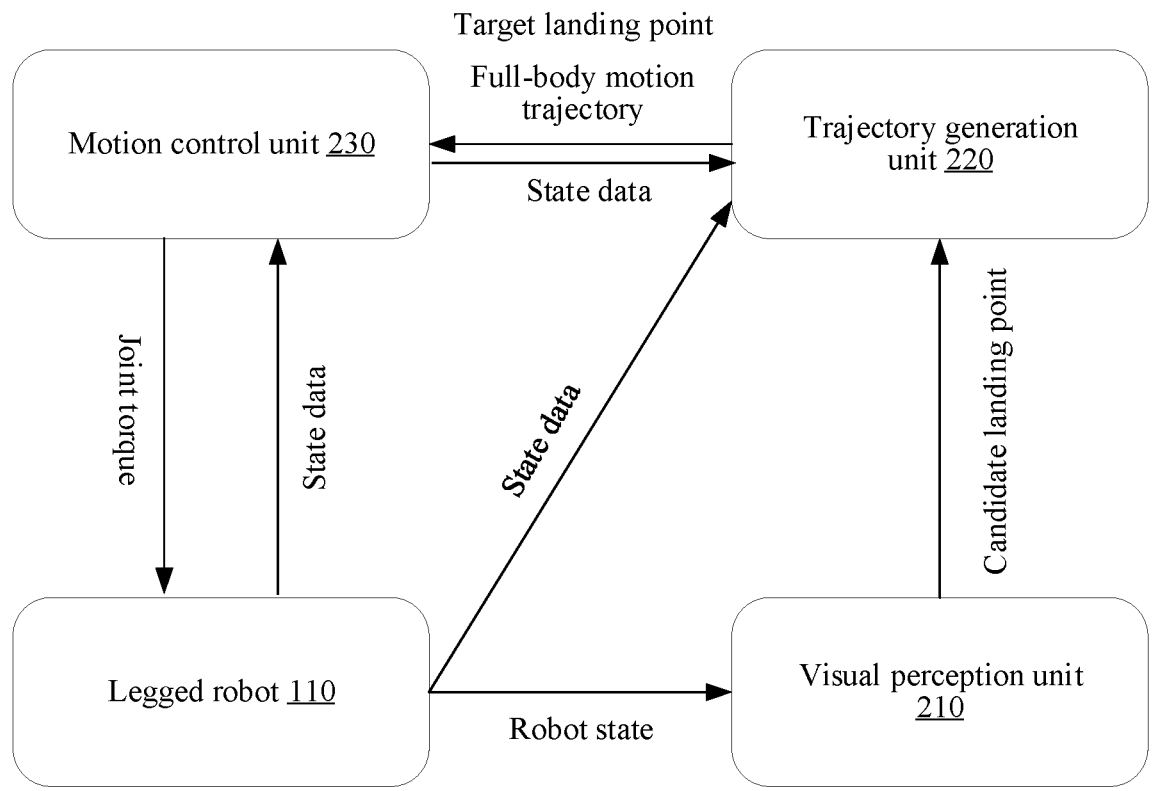
FIG. 2 is an architectural diagram of a system for controlling motion of a legged robot according to an embodiment of the present disclosure.

For a clearer introduction of a structure of the control device 120, exemplary introduction is made below with reference to a system for controlling motion of a legged robot shown in FIG. 2. In FIG. 2, for example, the control device 120 includes a visual perception unit 210, a trajectory generation unit 220, and a motion control unit 230.

The visual perception unit 210 may be arranged on the legged robot 110, for example, the visual perception unit 210 is mounted on a head portion of the legged robot 110. The visual perception unit 210 includes, for example, one or more of a camera and an infrared camera. For example, the camera is a RGBD camera. The visual perception unit further includes a function for implementing simultaneous localization and mapping.

The visual perception unit 210 collects the state data of the robot. The state data includes the state data at the start moment of the legged robot 110.

In addition, the visual perception unit 210 may further collect an image of the environment in which the legged robot 110 is located, and obtain a possible candidate landing point for each landing of the legged robot 110. After obtaining the state data and the environment image, the visual perception unit 210 may send the state data and the environment image to the trajectory generation unit 220.

Alternatively, the trajectory generation unit 220 may obtain the state data of the legged robot 110 through an internal sensor and an external sensor of the legged robot 110. Alternatively, the trajectory generation unit 220 may use target state data at an end moment in a previous preset period as state data at a start moment in a current preset period. Alternatively, the trajectory generation unit 220 obtains the state data of the legged robot 110 through a state estimator of the motion control unit 230.

The trajectory generation unit 220 receives the state data and the candidate landing point, and determines centroid positions, target landing points, and step duty ratios of the legged robot 110 at a plurality of moments according to the state data and the candidate landing point. The trajectory generation unit 220 obtains a centroid motion trajectory of the legged robot 110 according to the centroid positions, the step duty ratios and the like at the plurality of moments. Then, the trajectory generation unit 220 determines a full-body motion trajectory of the legged robot 110 according to the centroid motion trajectory and the target landing point, and sends the full-body motion trajectory and the target landing point to the motion control unit 230.

The motion control unit 230 may determine a joint torque of each joint of the legged robot 110 according to the full-body motion trajectory and the target landing point, and control each joint of the legged robot 110 to rotate according to the joint torque, thereby implementing the motion of the legged robot 110.

Further, the motion control unit 230 may further monitor real-time state data during movement of the legged robot 110, and control the motion of the legged robot 110 according to the real-time state data to ensure stable movement of the legged robot 110.

Based on the above application scenario, a general idea of the method for controlling motion of a legged robot involved in the embodiment of the present disclosure is introduced as follows:

In the embodiment of the present disclosure, a first correlation between a centroid position change parameter, a foot contact force, a landing point, and a step duty ratio is determined according to state data and a candidate landing point of each foot. A target centroid position change parameter, a target step duty ratio, and a target landing point are solved based on the first correlation and a constraint condition set. A centroid motion trajectory of the legged robot 110 is obtained according to the target centroid position change parameter and the target step duty ratio. A target motion control parameter of the legged robot 110 is determined according to the centroid motion trajectory, the target step duty ratio, and the target landing point. The target motion control parameter is used to control the motion of the legged robot 110.

Further, when determining the target centroid position change parameter, the target landing point and the target step duty ratio, the constraint condition set and the first correlation may be used to convert the problem of determining the target centroid position change parameter, the target landing point and the target step duty ratio into a mixed integer quadratic programming problem. By solving the mixed integer quadratic programming problem, the target centroid position change parameter, the target landing point and the target step duty ratio are obtained. The first correlation and the constraint condition set are pre-configured in the control device 120, or obtained by the control device 120 from other devices or network resources, or created by the control device 120. The following exemplarily introduces the method for creating the first correlation and the constraint condition set by the control device 120:

I. Obtain a First Correlation.

The control device 120 may obtain, from network resources or other devices, a correlation between a centroid position at each sampling moment and a foot contact force at the corresponding moment. The meaning of the foot contact force may refer to the content discussed above, and is not repeated here. The centroid position at each sampling moment in the correlation is represented by a start centroid position, the centroid position change parameter, and a time interval jointly. The time interval is represented by the step duty ratio. Thereby, the correlation between the centroid position at each sampling moment and the foot contact force at the corresponding moment is converted into the first correlation between the centroid position change parameter, the foot contact force, the landing point, and the step duty ratio. After obtaining the first correlation, the control device 120 may store the first correlation in any form, such as a function form or a description statement form.

The following specifically and exemplarily introduces a process of creating the first correlation by the control device 120:

1: Obtain a centroid dynamics motion equation of the legged robot 110.

The centroid dynamics motion equation is used to represent a relationship between the motion of the legged robot 110 and an external force applied. The centroid dynamics motion equation may be expressed in various forms, such as Newton-Euler equation, and an example of the centroid dynamics motion equation is as follows:

$$\begin{bmatrix} m(\ddot{p}_G - g) \\ \dot{L} \end{bmatrix} = \sum_{i=1}^{N_c} \begin{bmatrix} I_{3\times 3} \\ \hat{r}_i - \hat{p}_G \end{bmatrix} f_i \quad (1)$$

Where, m is a total mass of the legged robot 110, $g \in R^3$ is a gravitational acceleration, $p_G \in R^3$ is a centroid position of the legged robot 110, $\hat{r}_i \in R^3$ is a position of an i-th contact point in which the legged robot 110 is in contact with a contact surface, or may be referred to as a landing point, that is, a position of a foot being in contact with the contact surface, $L \in R^3$ is a centroid angular momentum of the legged robot 110, $\dot{L}$ represents a first derivative of the centroid angular momentum relative to time, $f_i \in R^3$ is a foot contact force of the i-th contact point, $N_c$ is a quantity of contact points, that is, a quantity of landing feet, a $\widehat{(\,)}$ operation represents an oblique diagonal array of ( ), $\ddot{p}_G$ represents a second derivative of $p_G$ relative to a time interval, I represents a unit matrix, and $R^3$ represents three coordinate values in a coordinate system.

In the embodiments of the present disclosure, unless otherwise specified, each amount is a representation result in a world coordinate system. For example, each variable in formula (1) is a representation result in the world coordinate system.

The first three rows in formula (1) are obtained according to Newton's law, and the last three rows are obtained according to Euler's equation.

Further, according to the first three rows in the above formula (1), it can be seen that:

$$m(\ddot{p}_G - g) = \sum_{i=1}^{N_c} I \quad (2)$$

Substitute formula (2) into formula (1) to obtain the following formula:

$$\begin{bmatrix} m(\ddot{p}_G - g) \\ m\widehat{p}_G(\ddot{p}_G - g) + \dot{L} \end{bmatrix} = \sum_{i=1}^{N_c} \begin{bmatrix} I_{3\times 3} \\ \hat{r}_i \end{bmatrix} f_i = \sum_{i=1}^{N_c} G_i f_i \quad (3)$$

Where, $$G_i = \begin{bmatrix} I_{3\times 3} \\ \hat{r}_i \end{bmatrix}, \quad G_i \in R^{3\times 3}$$

is a 3×3 matrix.

2: Represent a centroid position at each sampling moment in the centroid dynamics motion equation as a sum of a start centroid position and a centroid position variation after a time interval t to obtain a third correlation.

①: Set the centroid position as the sum of a centroid position at a start moment and the centroid position variation after the time interval t, to be specific:

$$p_G = p^{init} + p_t \quad (4)$$

Where $p^{init}$ represents the start centroid position, and $p_t$ represents the centroid position variation after the time interval t.

②: Substitute formula (4) into formula (3) to obtain the third correlation as follows:

$$Gf = m \begin{bmatrix} \ddot{p}_t \\ \widehat{p^{init}} \ddot{p}_t + \hat{g} p_t \end{bmatrix} - m \begin{bmatrix} g \\ \widehat{p^{init}} g \end{bmatrix} + \begin{bmatrix} 0_{3\times 1} \\ m\hat{p}_t \ddot{p}_t \end{bmatrix} + \begin{bmatrix} 0_{3\times 3} \\ \dot{L} \end{bmatrix} \quad (5)$$

The items in the above third correlation are analyzed as follows:

The first item $$m\begin{bmatrix} \ddot{p}_t \\ \widehat{p^{init}}\ddot{p}_t + \hat{g}p_t \end{bmatrix}$$

has a linear relationship with $\ddot{p}_t$ and $p_t$, the second item $$m\begin{bmatrix} g \\ \widehat{p^{init}}g \end{bmatrix}$$

is a constant item, the third item $$\begin{bmatrix} 0_{3\times 3} \\ \dot{L} \end{bmatrix}$$

has $\dot{L}$, and the fourth item $$\begin{bmatrix} 0_{3\times 1} \\ m\hat{p}_t \ddot{p}_t \end{bmatrix}$$

has a product of $\hat{p}_t$ and $\ddot{p}_t$.

As an embodiment, when a pose of the legged robot 110 changes less, $\dot{L}$ is approximately $0_{3\times 1}$, alternatively, a value of the third item $$\begin{bmatrix} 0_{3\times 3} \\ \dot{L} \end{bmatrix}$$

may be determined according to a pre-configured pose of the legged robot 110 at each sampling moment.

In one embodiment, the value of $\dot{L}$ may be determined according to a given pose at the start moment and a given pose at the end moment of the legged robot. A formula for determining $\dot{L}$ is described below:

A pose variation in the preset period may be represented as:

$$\Delta R = R_{te} R_{ts}^T \qquad (6)$$

Where, $(\ )^T$ in the present disclosure represents performing transposition processing on $(\ )$; $\Delta R$ is the pose variation, $R_{ts}$ is the given pose at the start moment, and $R_{te}$ is the given pose at the end moment. The pose variation may be represented as rotating a certain pose angle $\theta$ around a certain unit axis I:

$$\theta = \cos^{-1}\left(\frac{\Delta R_{11} + \Delta R_{22} + \Delta R_{33} - 1}{2}\right) \qquad (7)$$

$$1 = \frac{1}{2\sin(\theta)}\begin{bmatrix} \Delta R_{32} - \Delta R_{23} \\ \Delta R_{13} - \Delta R_{31} \\ \Delta R_{21} - \Delta R_{12} \end{bmatrix} \qquad (8)$$

Where, the unit axis I is a rotation axis represented by a vector, $\Delta R_{11}$ represents an element in row 1 and column 1 in $\Delta R$, $\Delta R_{22}$ represents an element in row 2 and column 2 in $\Delta R$, $\Delta R_{23}$ represents an element in row 2 and column 3 in $\Delta R$, $\Delta R_{32}$ represents an element in row 3 and column 2 in $\Delta R$, $\Delta R_{21}$ represents an element in row 2 and column 1 in $\Delta R$, $\Delta R_{12}$ represents an element in row 1 and column 2 in $\Delta R$, $\Delta R_{21}$ represents an element in row 2 and column 1 in $\Delta R$.

When satisfying the following conditions, cubic curve interpolation is performed on a pose change angle:

$$\theta_{ts}=0, \dot{\theta}_{ts}=0, \theta_{te}=0, \dot{\theta}_{te}=0$$

Where, $\theta_{ts}$ represents a pose change angle at the start moment, $\theta_{te}$ represents a pose change angle at the end moment, $\dot{\theta}_{ts}$ represents a value of a first derivative of the pose change angle relative to time at the start moment, $\dot{\theta}_{te}$ represents a value of the first derivative of the pose change angle relative to time at the end moment, and thus, the given pose of the legged robot at any moment may be represented as:

$$R_t = (I + \hat{I}\sin\theta_t + \hat{I}^2(1-\cos\theta_t))R_{ts} \qquad (9)$$

Where, I represents a unit matrix, $R_t \in R^3 \times^3$ is a rotation matrix and represents a given pose of the legged robot 110 at a corresponding moment, and $\theta_t$ represents a corresponding pose change angle at any moment.

$$\dot{L} = I_0^s \dot{\omega}_0^s - (I_0^s \omega_0^s) \times \omega_0^s$$

$$I_0^s = R_t I_0 R_t^T, \omega_0^s = I\dot{\theta}_t, \dot{\omega}_0^s = I\ddot{\theta}_t \qquad (10)$$

Where, $I_0$ represents a rotation inertia of the legged robot about the centroid in a body coordinate system. $I_0^s$ represents a rotation inertia of the legged robot in a certain coordinate system, an origin of the coordinate system is the centroid position of the legged robot 110, and a pose of the coordinate system is the same as a pose of the world coordinate system. $I_0^s$ may be a fixed value, $\omega_0^s$ represents a representation result of $\omega$ in the world coordinate system, and $\omega$ represents an angle velocity in the body coordinate system. $\dot{\Theta}_t$ represents a pose change angle velocity, and $\ddot{\theta}_t$ represents a pose change angle acceleration.

3: Represent the centroid position variation in the fourth item $\hat{p}_t \ddot{p}_t$ in the third correlation as a vector sum of the variation in each direction to obtain a fifth correlation:

$$\hat{p}_t \ddot{p}_t = \hat{p}_t {}^{xy}\ddot{p}_t{}^{xy} + \hat{p}_t {}^{xy}\ddot{p}_t{}^z + \hat{p}_t {}^z\ddot{p}_t{}^{xy} + \hat{p}_t {}^z\ddot{p}_t{}^z \qquad (11)$$

Where $p_t = p_t^{xy} + p_t^z$, $p_t^{xy}$ includes components of $p_t$ on x and y axes. $\ddot{p}_t^{xy}$ refers to a second derivative of a component of the centroid position variation $p_t$ on a plane formed by the x and y axes relative to time, that is, a component of a centroid acceleration on the plane formed by the x and y axes; $\ddot{p}_t^z$ refers to a second derivative of a component of the centroid position variation $p_t$ on a z axis relative to time, that is, a component of the centroid acceleration on the z axis; $\hat{p}_t^{xy}$ represents an oblique diagonal array of the component of the centroid position variation $p_t$ on the plane formed by the x and y axes, and $\hat{p}_t^{z}$ represents an oblique diagonal array of the component of centroid position variation $p_t$ on the z axis. A z-coordinate of $p_t^{xy}$ is 0, $p_t^z$ includes a component of $p_t$ on the z axis, and an x-coordinate and a y-coordinate of $p_t^z$ are 0. A torque generated around the z axis is $m\hat{p}_t^{xy}\ddot{p}_t^{xy}$, and a torque in one direction in an x-y plane is $m(\hat{p}_t^{xy}\ddot{p}_t^z + \hat{p}_t^z\ddot{p}_t^{xy})$. Since $\ddot{p}_t^z$ and $p_t^z$ are co-linear, $\hat{p}_t^z\ddot{p}_t^z = 0$.

Additionally, the motion of the legged robot 110 in a z-axis direction is generally relatively stable, and thus $\ddot{p}_t^z$, $p_t^z$, and $\hat{p}_t^{xy}\ddot{p}_t^z + \hat{p}_t^z\ddot{p}_t^{xy}$ may be ignored. In addition, absolute values of $p_t^{xy}$, $\ddot{p}_t^{xy}$, and $\hat{p}_t^{xy}\ddot{p}_t^{xy}$ are relatively small and may also be ignored. In a process of controlling the legged robot 110, a torque $m\hat{p}_t \ddot{p}_t$ related to the above formula (11)

may be compensated by adjusting the foot contact force between the foot and the contact surface.

As an embodiment, the fifth item in the third correlation may be ignored to obtain a sixth correlation:

$$Gf \approx H_0 x_t - w \quad (12)$$

Where, $$H_0 = m\begin{bmatrix} 0_{3\times3} & I_{3\times3} \\ \hat{g} & \overline{p^{init}} \end{bmatrix}, x_t = \begin{bmatrix} p_t \\ \ddot{p}_t \end{bmatrix}, w = \begin{bmatrix} mg \\ m\overline{p^{init}}g - \dot{L} \end{bmatrix}.$$

Where, $H_0$ may be calculated and obtained according to the centroid position at the start moment, w may be a fixed value, or calculated and obtained according to a pose of the legged robot at each sampling moment, and $x_t$ includes the centroid position variation $p_t$ and the centroid acceleration $\ddot{p}_t$, which is to be determined.

4: Set the centroid position variation to an n-order polynomial with time as an independent variable, to be specific:

The centroid position variation $p_t$ may be represented as three components on the x, y and z axes, and the centroid position variation may be represented as:

$$p_{*t}=[1\ t\ \ldots\ t^n]c_* \quad (13)$$

Where, $c_*=[c_{*,0}\ c_{*,1}\ \ldots\ c_{*,n}]^T \in R^{n+1}$ is a polynomial coefficient, t represents the time interval, that is, a time interval between this moment and a corresponding moment of the start moment, * refers to x, y, and z, and c refers to a centroid position change parameter, which contains all polynomial coefficients. After obtaining the centroid position change parameter c, a centroid position at any moment can be calculated according to the above formula (13).

As an embodiment, a value of n is any integer greater than or equal to 2.

5: Represent each time interval by a step duty ratio.

Define the step duty ratio of the legged robot as:

$$d = \frac{t_{sw}}{t_{sw}+t_{sd}} \quad (14)$$

Where d represents the step duty ratio, $t_{sw}$ represents a step duration of a single leg of the legged robot in a preset period, and $t_{sd}$ represents a support duration of a single leg of the legged robot in a preset period.

When the preset period is determined, a preset period $t_e=t_{sw}+t_{sd}$ of a leg of the legged robot is known, and a preset period of each leg of the legged robot which performs a step and the step duty ratio are the same.

For example, using a case that the legged robot first steps a leg and then supports as an example:

A step duration of a single leg may be represented as: $0 \sim d*t_e$

A support duration of a single leg may be represented as: $d*t_e \sim t_e$

A: If sampling points are taken as n equal points of the step duration, a time interval between an arbitrary sampling moment and the start moment may be represented as:

$$\frac{kdt_e}{n}$$

B: If sampling points are taken as m equal points of the support duration, a time interval between an arbitrary sampling moment and the start moment may be represented as:

$$\frac{k(1-d)t_e}{m} + dt_e$$

Combining the two cases of A and B, it can be seen that the time interval between an arbitrary sampling moment and the start moment is in a linear relationship with the step duty ratio d, and thus the time interval between an arbitrary sampling moment and the start moment may be represented, using the step duty ratio, as the following second correlation:

$$t=k_t d+b_t \quad (15)$$

Combined with formula (15), formula (13) may be represented as the following formula:

$$p_{*t} = (d^T K_{pt} + b_p^T)c_* = \frac{1}{2}\begin{bmatrix} c_* \\ h \end{bmatrix}^T \begin{bmatrix} 0 & K_{pt}^T \\ K_{pt} & 0 \end{bmatrix}\begin{bmatrix} c_* \\ h \end{bmatrix} + b_p^T c_* \quad (16)$$

Where, $$h = \begin{bmatrix} d \\ \vdots \\ d^n \end{bmatrix}, K_{pt} = \begin{bmatrix} 0 & k_t & \ldots & nk_t b_t^{n-1} \\ \vdots & \ddots & \ddots & \vdots \\ 0 & \ldots & 0 & k_t^n \end{bmatrix}, b_p = \begin{bmatrix} 1 \\ b_t \\ \vdots \\ b_t^n \end{bmatrix} \quad (17)$$

Where, in the above formula (16), an element in row i and column j in an upper-right corner in $K_{pt}$ may be represented as $C_{j-1}^{\ i}k_t^i b_t^{I-1-i}$, where $2\leq i+1\leq j\leq n+1$, and I is a combination number of i numbers selected from a (j−1)-th number.

Solve a second derivative of formula (16) relative to time to obtain the following fourth correlation:

$$a_{*t} = (d^T K_{at} + b_a^T)c_* = \frac{1}{2}\begin{bmatrix} c_* \\ h \end{bmatrix}^T \begin{bmatrix} 0 & K_{at}^T \\ K_{at} & 0 \end{bmatrix}\begin{bmatrix} c_* \\ h \end{bmatrix} + b_a^T c_* \quad (18)$$

$a_t$ is the same as $\ddot{p}_t$ in the previous content, which represents a centroid acceleration, where:

$$K_{at} = \begin{bmatrix} 0 & 0 & 0 & 6k_t & \ldots & n(n-1)(n-2)k_t b_t^{n-3} \\ \vdots & \vdots & \ddots & \ddots & \ddots & \vdots \\ \vdots & \vdots & \vdots & \vdots & \ddots & n(n-1)k_t^{n-2} \\ 0 & 0 & 0 & 0 & \ldots & 0 \\ 0 & 0 & 0 & 0 & \ldots & 0 \end{bmatrix} \quad (19)$$

$$b_a = \begin{bmatrix} 0 \\ 0 \\ 2\times1\times b_t^0 \\ \vdots \\ n(n-1)b_t^{n-2} \end{bmatrix} \quad (20)$$

An element In row i and column j in an upper-right corner in $K_{at}$ is $C_{j-3}^{\ i}(j-1)(j-2)k_t^i I_t^{j-3-I}$, $(4\leq i+3\leq j\leq n+1)$.

Combined with formula (12), formula (16), and formula (18), the following formula is obtained:

$$\Sigma_{i=1}^{N_c} G_i f_i \approx H_0 T - w \quad (21)$$

Where, $T=[T_p^T T_a^T]^T$, $T_p=[p_{xt}p_{yt}p_{zt}]^T$, $T_a=[a_{xt}a_{yt}a_{zt}]^T$.

Where, $T_p$ represents a joint representation result of centroid change components of a centroid position variation in the x, y and z axes, $p_{xt}$ represents a component of the centroid position variation in an x-axis direction, $p_{yt}$ represents a component of the centroid position variation in a y-axis direction, and $p_{zt}$ represents a component of the centroid position variation in a z-axis direction. $T_a$ represents a joint representation result of centroid acceleration components of the centroid acceleration in the x, y and z axes, $a_{xt}$ represents a component of the centroid acceleration in the x-axis direction, $a_{yt}$ represents a component of the centroid acceleration in the y-axis direction, and $a_{zt}$ represents a component of the centroid acceleration in the z direction.

6: Introduce a candidate landing point into formula (21).

The foot of the legged robot 110 that needs to land usually has more than one candidate landing point, that is, $r_i \in \{r_{ij}|j\text{I}1,2,3 \ldots N_i\}$ mentioned above, $r_{ij}$ denotes a position of a j-th candidate landing point of an i-th foot, and $N_i$ represents a quantity of candidate landing points of the i-th foot.

As an embodiment, only a value range of a foot contact force $f_i$ corresponding to the selected candidate landing point is not zero, so binary variables $\beta_{ij} \in \{0, 1\}$ may be introduced, and that $j=1, 2, 3 \ldots N_i$ represents which candidate landing point is the selected target landing point, that is:

$$r_i = \Sigma_{j=1}^{N_i} \beta_{ij} r_{ij} \qquad (22)$$

Where, $$\Sigma_{j=1}^{N_i} \beta_{ij} = 1 \qquad (23)$$

Formula (23) indicates that only one binary variable is equal Io 1 in $N_i$, and the rest is 0, indicating that only one candidate landing point can be selected as the target landing point. The centroid motion equation is rewritten according to the candidate landing point to obtain the following rewritten centroid motion equation:

$$\Sigma_{i=1}^{Nc} \Sigma_{j=1}^{Ni} G_{ij} f_{ij} \approx H_0 T - w \qquad (24)$$

Since values of $f_{ij}$, w, and $N_i$ may be different at different moments, the above formula (24) may be further represented as the first correlation shown below:

$$\Sigma_{i=1}^{Nc} \Sigma_{j=1}^{Nik} G_{ij} f_{ijk} = H_0 T - w_k \qquad (25)$$

$T=[T_p^T T_a^T]^T$, $T_p=[p_{xt} p_{yt} p_{zt}]^T$, $T_a=[a_{xt} a_{yt} a_{zt}]^T$. In order to simplify the representation of the formula, a specific representation of T is not shown in formula (25).

The following is an example to describe $N_{ik}$. For example, the legged robot 110 stands on by support of four legs at the start moment, then a position in which each foot is currently in contact with the contact surface is a start landing point of each foot of the legged robot 110. If the legged robot steps the i-th foot at a next moment, and there are three candidate landing points corresponding to the i-th foot, then the corresponding $N_{ik}$ at this moment is 3. If the legged robot steps a (i−1)-th foot at another next moment, and there are four candidate landing points of the (i−1)-th foot, then the corresponding $N_{ik}$ at this moment is 4.

Where, $$G_{ij} = \begin{bmatrix} I_{3\times 3} \\ \hat{r}_{ij} \end{bmatrix};$$

at the start moment, $r_{ij}$ corresponds to the start landing point, and at other corresponding moments, $r_{ij}$ corresponds to candidate landing points corresponding to the other moments. k represents a k-th moment, and $f_{ijk}$ represents a foot contact force of the j-th candidate landing point of the i-th foot at the k-th moment. $w_k$ represents w corresponding to the k-th moment, and a specific calculation formula of w may refer to the previous content.

The above content is an exemplary description of the process of creating the first correlation. In the above process, other dynamics equations may be used to describe the centroid motion trajectory of the legged robot 110, thereby transforming the other dynamics equations to obtain the first correlation.

II. Obtain a Constraint Condition Set.

The constraint condition set includes one or more constraint conditions. Each constraint condition is a value used to constrain one or more of the centroid position change parameter, the landing point, the step duty ratio, and the foot contact force. Each constraint condition may be in the form of an inequality. The constraint condition set includes one or more of a spatial landing point constraint condition, a friction force constraint condition, and a foot contact force constraint condition. The meaning of each constraint condition may refer to the content discussed above, and is not repeated here.

Since a size of the foot contact force of the legged robot 110 is different at each sampling moment, a friction force between the foot and the contact surface is also different at each sampling moment. Therefore, a friction force constraint condition constrains a size of the friction force between the foot being in contact with the contact surface and the contact surface at each sampling moment, while a contact force constraint condition constrains a contact force size of the foot contact force in a normal direction at each sampling moment.

The control device 120 may obtain the constraint condition set from network resources, or other devices, or create the constraint condition set by itself. The following exemplarily describes the creation of each constraint condition by the control device 120:

(1) Obtain the Spatial Landing Point Constraint Condition.

1: Approximate a workspace corresponding to the foot of the legged robot 110 as a convex polyhedron, obtain a linear inequality representation of each surface in the convex polyhedron, and combine the linear inequality of each surface to obtain a linear inequality representation of the convex polyhedron. The linear inequality of the convex polyhedron is represented as follows:

$$\text{I}x_i \leq d_i \qquad (26)$$

Where, $S_i=[s_{i1} \, s_{i2} \ldots s_{il}] \in R^{3\times l}$, $d_i=[d_{i1} \, d_{i2} \ldots d_{il}]\text{I} \in R^1$, $x_i$ represents the landing points of the legged robot 110 in the coordinate system, $d_{i1}$ is a distance between a surface and an origin of the convex polyhedron, $s_{i1}$ represents a unit normal vector corresponding to the surface of the convex polyhedron, and l represents a quantity of surfaces corresponding to the convex polyhedron. The convex polyhedron is determined according to a motion range of a joint configured at the foot of the legged robot 110, and a length of the joint. The motion range includes a rotation range of the joint or a translation range of the joint.

Specifically, the control device 120 discretely determines a position reachable by the foot of the legged robot 110 relative to the joint, according to the motion range of the joint and the length of the joint of the legged robot 110. The joint is a joint configured at the landing foot, to be specific, may be a joint directly connected to the foot, or other joints connected to the foot through the joint. The motion range of the joint refers to a range including the minimum and maximum angles at which the joint is able to move, for example, the motion range of the joint is 0° to 120°, which is generally known. The length of the joint is, for example, 1 meter.

Figure 3:
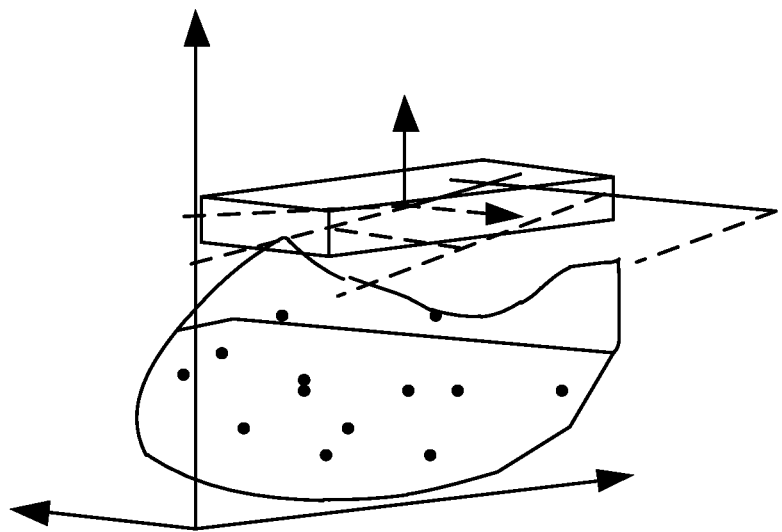
FIG. 3 is an example diagram of a workspace according to an embodiment of the present disclosure.

After discretely determining a plurality of positions reachable by the foot of the legged robot 110 relative to the joint, the control device 120 fits the plurality of positions, thereby obtaining a workspace of the foot of the legged robot 110. The workspace of the foot of the legged robot 110 is generally non-convex, but the workspace may be approximated as a convex polyhedron by a fitting method. The convex polyhedron is specifically a convex polyhedron 310 as shown in FIG. 3, and each of a plurality of points shown in FIG. 3 represents a position reachable by the foot relative to the joint.

After approximating the workspace as a convex polyhedron, the control device 120 may obtain a linear inequality representation of each surface in the convex polyhedron, and the linear inequality representation of each surface is specifically represented as $s_{il}^T x_i \le d_{il}$. The control device 120 combines the inequalities of the surfaces of the convex polyhedron to obtain formula (26) as described above.

In some embodiments, the above formula (26) may be performed in a local fixed coordinate system of the joint. The local fixed coordinate system of the joint refers to a coordinate system established with a local part of the joint as a coordinate origin, that is, the coordinate origin of the local fixed coordinate system of the joint may be different from a coordinate origin of the world coordinate system. The joint may be any joint related to the landing foot.

Figure 4A:
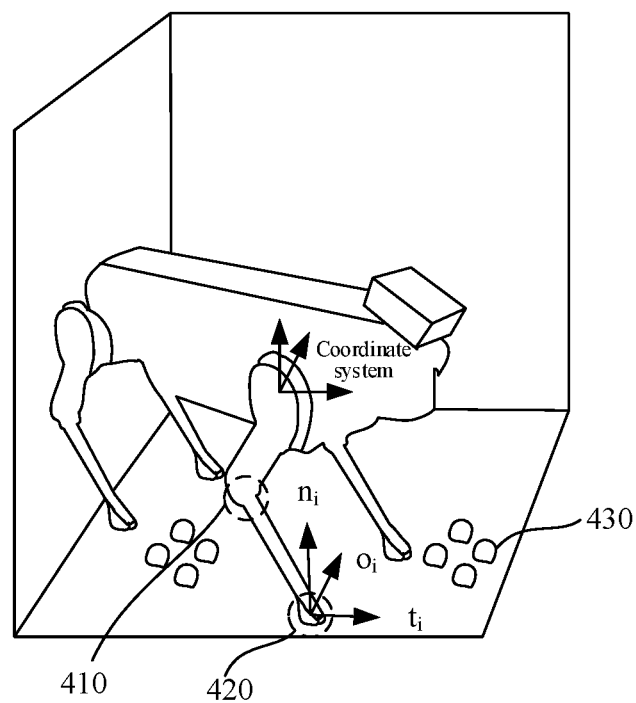
FIG. 4A is an example diagram of a structure of a legged robot according to an embodiment of the present disclosure.

For example, with reference to FIG. 4A, which is a schematic structural diagram of the legged robot 110, the legged robot 110 includes a plurality of joints 410 and four feet 420, and each foot 420 is configured with a plurality of joints. The local fixed coordinate system of the joint is shown in FIG. 4A. In the local fixed coordinate system of the joint, each variable may be decomposed into a plurality of variables according to the local fixed coordinate system of the joint.

As discussed above, the control device 120 determines in advance a candidate landing point 430 corresponding to a foot that needs to land, and the control device 120 may determine whether a selected candidate landing point 430 is located in the convex polyhedron of the foot according to the above formula (26). For example, it may be determined whether a landing point of the i-th foot of the legged robot 110 is located in the convex polyhedron after the time interval t.

2: Convert a landing point position $r_i$ into a representation result of the local fixed coordinate system to obtain the sixth correlation.

Since the above formula (26) is a representation result in the local fixed coordinate system, it is necessary to convert the position $r_i$ of the landing foot in the world coordinate system (also referred to as a global coordinate system) into a representation result $x_i$ in the local fixed coordinate system, and a specific conversion process is represented by:

$$x_i = R_{i1}^T (R_t^T (r_i - p_G) - p_{i1}) \quad (27)$$

Where, $p_{i1} \in R^3$ is a position of the joint of the i-th foot in the legged robot 110 relative to the centroid of the legged robot 110 in a body coordinate system, and $R_{i1} \in R^3$ is a pose of the joint relative to the body coordinate system in the local fixed coordinate system. Both $p_{i1}$ and $R_{i1}$ are constants.

As an embodiment, when the pose of the legged robot 110 changes less, $R_t$ may be a constant, or the control device 120 may determine according to a given pose of the legged robot 110 at a corresponding moment.

3: Represent the centroid position in formula (16) as a time-dependent n-order polynomial, and substitute the polynomial into the sixth correlation to obtain a seventh correlation:

The control device 120 combines the above formulas (4), (16), (26) and (27) to obtain a seventh correlation:

$$A_i T_P + B I_i r_i \le b_i \quad (28)$$

Where, $$A_i = -S_i^T R_{i1}^T R_t^T$$

$$B_i = S_i^T R_{i1}^T R_t^T$$

$$b_i = d_i + S_i^T R_{i1}^T p_{i1} + S_i^T R_{i1}^T R_t^T p^{init}$$

4: Introduce the selected candidate landing point and time into the seventh correlation to obtain the spatial landing point constraint condition.

The selected candidate landing point is introduced into the seventh correlation, specifically combining formula (22) and formula (28), to obtain a ninth correlation represented as:

$$A_i T_P + \sum_{j=1}^{N_i} \beta_{ij} I_i r_{ij} \le b_i \quad (29)$$

Since values of some amounts corresponding to the spatial landing point constraint condition are different at different moments, the time may be introduced into the ninth correlation to obtain the spatial landing point constraint condition as:

$$A_{ik} T_{Pk} + \sum_{j=1}^{N_{ik}} \beta_{ij} B_{ik} r_{ij} \le b_{ik} \quad (30)$$

Where, $T_{Pk}$, $A_{ik}$, $B_{ik}$, $b_{ik}$ and $N_{ik}$ respectively represent $TI_P$, $A_i$, $B_i$, $b_i$ and $N_i$ corresponding to the k-th moment.

The following exemplarily describes the method for creating the friction force constraint condition and the contact force constraint condition by the control device 120:

(2) Obtain the Friction Force Constraint Condition.

1: Determine a friction force constraint representation corresponding to each contact force to obtain an eighth correlation.

Each foot contact force $f_i$ (i=1, 2 . . . $N_c$) is constrained by a friction force. The friction force constraint is to constrain the foot contact force to be in a friction cone. The friction cone is generally a cone, but since the expression of the cone is a non-linear trigonometric function, the cone is approximated as an inscribed pyramid in the embodiment of the present disclosure. The inscribed pyramid may be represented jointly by four surfaces of the pyramid. Therefore, the friction force constraint condition in the embodiment of the present disclosure may be specifically approximated as the following eighth correlation:

$$N_i^T f_i \le 0 \quad (31)$$

Where, $N_i = -[\mu_i n_i - o_I \mu_i n_i + o_I \mu_i n_i - t_I \mu_i n_i + I] \in R^{3 \times 4}$, $n_i$ represents a normal vector of the landing point of the i-th foot, $o_I$ represents a vector of the landing point of the i-th foot in a tangential direction, $t_I$ represents a vector of the landing point of the i-th foot in another tangential direction, and $\mu_i$ represents a friction coefficient between the foot and the contact surface. $N_i$ may be understood as a four-surface constraint of the friction cone, and a foot contact force satisfying formula (32) is located in the friction cone.

Figure 4B:
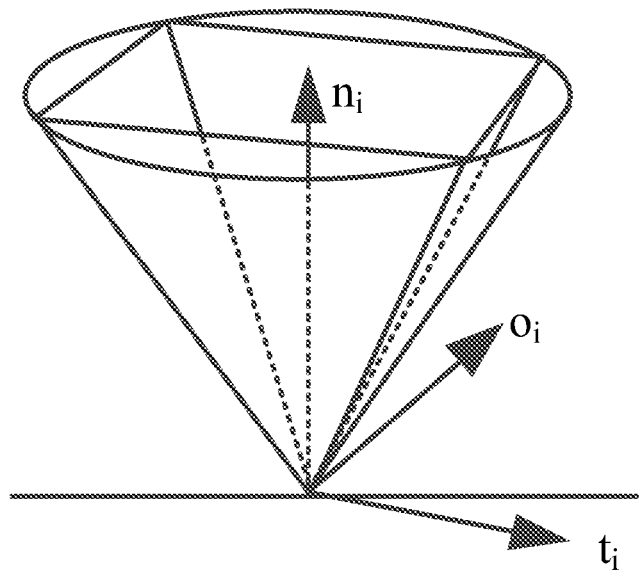
FIG. 4B is an example diagram of a friction cone according to an embodiment of the present disclosure.

For example, with reference to FIG. 4B, which is an example diagram of a friction cone, the friction cone is a cone shown in FIG. 4B, and in the embodiment of the present disclosure, the cone is replaced by the inscribed pyramid shown in FIG. 4B.

For example, with continued reference to FIG. 4A, a local coordinate system determined by a normal direction of the contact point is shown in FIG. 4A. The local coordinate system may refer to $o_i$, $n_i$ and $t_f$ as shown in FIG. 4A, and $o_i$, $n_i$ and $t_f$ in FIG. 4A correspond to $o_j$, $n_i$ and $t_f$ in FIG. 4B respectively.

A value of the corresponding friction coefficient may also be different when the material of the contact surface contacted by the foot is different. At the same moment, contact surfaces contacted by different feet are different, and friction force coefficients between the different feet and the contact surfaces may also be different.

In the embodiment of the present disclosure, description is made using that the cone is approximated as an inscribed pyramid as an example, but the cone may be approximated as another multi-pyramid, which is not specifically limited.

2: Introduce the time and the landing foot into the eighth correlation to obtain the friction force constraint condition.

Specifically, a normal vector at a position $r_{ij}$ corresponding to the foot is $n_{ij}$, the foot contact force is $f_{ij}$, and the ninth correlation is obtained:

$$N_{ij}^T f_{ij} \leq 0 \qquad (32)$$

Where, $N_{ij} = -[\mu_i n_{ij} - o_{ij} \ \mu_i n_{ij} + o_{ij} \ \mu_i n_{ij} - t_{ij} \ \mu_i n_{ij} + t_{ij}] \in R^{3 \times 4}$, $n_{ij}$ represents a normal vector of the j-th candidate landing point of the i-th foot, $o_{ij}$ represents a vector of the j-th candidate landing point of the i-th foot in a tangential direction, $t_{ij}$ represents a vector of the j-th candidate landing point of the i-th foot in another tangential direction, and $\mu_i$ represents the friction coefficient between the foot and the contact surface.

At different moments, the foot contact force varies in size, and thus the moment may be introduced into formula (32) to obtain the friction force constraint condition as:

$$N_{ij}^T f_{ijk} \leq 0 \qquad (33)$$

Where, $f_{ijk}$ represents the foot contact force of the j-th candidate landing point of the i-th foot at the k-th moment.

(3) Obtain the Contact Force Constraint Condition.

In a motion process of the legged robot 110, if the foot contact force between the foot and the contact surface is excessively large, components of the legged robot 110 are easily damaged. Therefore, the contact force constraint condition may be set to constrain a size of the foot contact force between the legged robot 110 and the contact surface, so as to avoid an excessively large acting force between the legged robot 110 and the contact surface during each motion.

The following exemplarily describes the method for creating the contact force constraint condition by the control device 120:

1: Set a component of the foot contact force in the normal direction to be less than or equal to an upper limit of the contact force to obtain a tenth formula:

$$n_i^T f_i \leq f_i^u \qquad (34)$$

Where $f_i^u$ represents the upper limit of the contact force, the value of which may be set according to an actual situation, for example, the value may be set by referring to a gravity of the legged robot.

2: Introduce the time and the landing foot into the tenth correlation to obtain the contact force constraint condition.

Since only the selected landing point can produce a contact force, formula (34) may be rewritten as:

$$n_{ij}^T f_{ij} \leq f_i^u \beta_{ij} \qquad (35)$$

Since the foot contact force at each sampling moment is different, the time is introduced into formula (35), which is specifically represented as:

$$n_{ij}^T f_{ijk} \leq f_i^u \beta_{ij} \qquad (36)$$

Where, $n_{ij}^T$ represents a value of $n_i^T$ corresponding to the j-th candidate landing point of the i-th foot, and $f_{ijk}$ represents the foot contact force of the j-th candidate landing point of the i-th foot at the k-th moment.

Since there are few correlations corresponding to the first correlation and the constraint condition set, and there are many unknown amounts to be solved, there may be more than one centroid position change parameter, landing point and the like satisfying the first correlation and the constraint condition set. Therefore, when solving the centroid position change parameter and the landing point in the above, a target centroid position change parameter, a target landing point and a target step duty ratio may be determined randomly from the values satisfying the first correlation and the constraint condition set.

Alternatively, in order to obtain a better centroid position change parameter, a better optimal landing point and a better step duty ratio, a cost function may further be introduced in an embodiment of the present disclosure. The cost function is used to select an optimal centroid position change parameter, an optimal landing point and an optimal step duty ratio. The optimal centroid position change parameter is determined as the target centroid position change parameter, the optimal landing point is determined as the target landing point, and the optimal step duty ratio is determined as the target step duty ratio.

Since solving the mixed integer quadratic programming problem necessarily makes it possible to obtain a corresponding solution, the determination of the target centroid position change parameter, the target landing point, and the target step duty ratio may be transformed into a mixed integer quadratic programming problem in the embodiment of the present disclosure. To this end, the cost function in the embodiment of the present disclosure includes at least a quadratic term of one or more variables, and the one or more variables may be any variable related to a candidate result satisfying the first correlation and the constraint condition set. The quadratic term may be constructed according to a quadratic of the variable.

In one embodiment, the cost function includes at least one of A1 to A5 as follows:

A1: A quadratic term related to the foot contact force in the preset period;

A2: A quadratic term of the centroid position variation in the preset period;

A3: A quadratic term of a difference between a first centroid position and a target/expected centroid position at the end moment in the preset period;

In one embodiment, the target centroid position is determined according to a landing point in the candidate result.

The target centroid position may be understood as a position of a suitable height above a center point of a polygon constituted by the target landing point of the legged robot in the preset period, and the position of a suitable height above the center point may specifically refer to adding a constant value based on the center point to obtain the target centroid position. The constant value may be determined according to a height of the legged robot. Alternatively, the target centroid position may be preset. For example, the target landing point specifically includes four target landing points, center points of the four target landing points may be determined, and then the height of the legged robot 110 may be added based on the center point, thereby obtaining the target centroid position.

The first centroid position may be determined according to the centroid position change parameter, and a specific calculation formula may refer to the above formula (16) and formula (4).

A4: A quadratic term of a difference between a first centroid velocity and a target centroid velocity at the end moment in the preset period;

In one embodiment, the target centroid velocity is determined according to the landing point in the candidate result, to be specific, after the target centroid position is determined, the target centroid velocity is obtained by dividing a difference between the target centroid position and an initial centroid position by time.

The first centroid velocity is obtained according to a first derivative correlation of formula (16).

A5: A quadratic term of a difference between a first centroid acceleration and a target centroid acceleration at the end moment in the preset period;

In one embodiment, the target centroid acceleration is determined according to the landing point in the candidate result, to be specific, after the target centroid velocity is determined, the target centroid acceleration is obtained by dividing a difference between the target centroid velocity and an initial centroid velocity by time. For example, the first centroid acceleration is obtained according to formula (18).

The following is an analysis of a role of each of the above quadratic terms:

Role of A1: The quadratic term related to the foot contact force may be used to optimize the distribution of an acting force between the foot and the contact surface, so that the distribution of the acting force between the foot and the contact surface is more uniform during a walking process of the legged robot 110.

Role of A2: The centroid position variation reflects a length of the centroid motion trajectory, which is conducive to reducing an oscillation amplitude of the centroid motion trajectory.

Role of A3 to A5: It is conducive to reducing errors between a calculated result and a target result.

Combining the above A1 to A5, an expression of a cost function is as follows:

$$J_{grf}+J_{len}+J_{tgt} \quad (37)$$

Where, $J_{grf}$ is a weighted sum of squares of all foot contact forces in the preset period, $J_{len}$ is a weighted sum of squares of a difference between centroid position variations at every two adjacent moments, and $J_{tgt}$ is a weighted sum of squares of a difference between the first centroid position and the target centroid position at the end moment in the preset period, a difference between the first centroid velocity and the target centroid velocity at the end moment in the preset period, and a difference between the first centroid acceleration and the target centroid acceleration at the end moment in the preset period.

Figure 5:
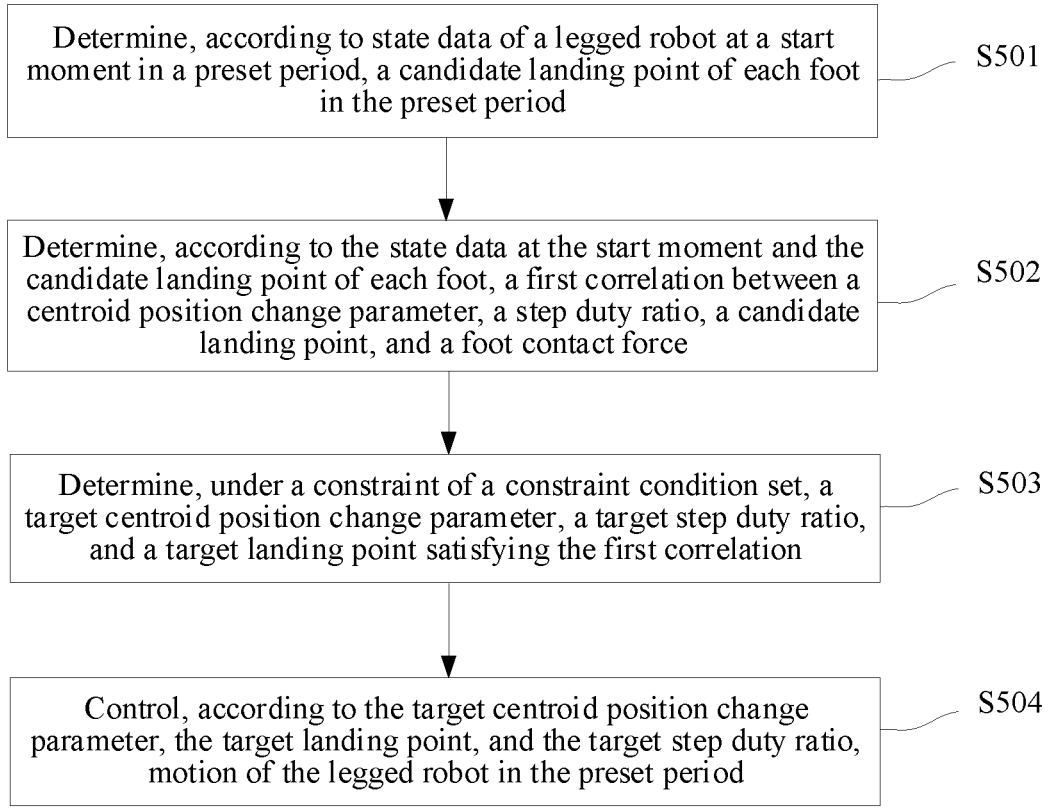
FIG. 5 is a flowchart of a method for controlling motion of a legged robot according to an embodiment of the present disclosure.

After introducing the construction of the first correlation, the constraint condition set and the cost function, the following exemplarily describes how to use the constructed first correlation and constraint condition set to control the motion process of the legged robot in the embodiment of the present disclosure in combination with the flow of the method for controlling motion of a legged robot shown in FIG. 5. With reference to FIG. 5, the method is executed by an electronic device, such as the control device 120 in FIG. 1, and the method includes:

S501: Determine, according to state data of the legged robot at a start moment in a preset period, a candidate landing point of each foot in the preset period.

In controlling the motion of the legged robot 110, the control device 120 controls the lifting and lowering of the foot of the legged robot 110, thereby implementing the movement of the legged robot 110, so that the legged robot 110 can complete the motion from the start moment to the end moment in the entire preset period. The start moment is a position where the legged robot 110 is located at the current moment. The end moment is a position to be reached by the legged robot 110, which may be set in advance or determined by the control device 120 according to a task to be performed by the legged robot 110.

The meaning of the state data and a method for obtaining the state data may refer to the content discussed above, and are not repeated here. The state data at the start moment may include a centroid position at the start moment. The state data at the start moment may further include a centroid velocity and a centroid acceleration at the start moment, and in addition, the state data may further include a given pose of the legged robot 110 at the start moment. The given pose, the centroid position, the centroid velocity, or the centroid acceleration may all be represented by coordinates in a coordinate system or by vectors, or the like.

As an embodiment, the preset period, the start moment, and the end moment are related to a sampling period of the selected legged robot 110, and the preset period, the start moment, and the end moment may be flexibly set according to actual needs.

For example, the control device 120 may determine the current moment of the legged robot 110 as the start moment, the control device 120 may determine a moment corresponding to the 3rd s as the end moment, and the 3rd s may be selected as a start moment of the motion of the legged robot 110 in a next sampling period.

After obtaining the state data at the start moment, the control device 120 may determine the candidate landing point of each foot in the preset period.

Specifically, during the process from the start moment to the end moment of the legged robot 110, there may be one or more feet to land, and each foot may land one or more times, which is specifically related to the set start moment and end moment. The control device 120 may pre-determine a plurality of candidate landing points for the foot that needs to land each time. The candidate landing point refers to a possible landing point of the legged robot 110 in the preset period. The landing point may be represented by coordinates in a world coordinate system or by vectors, or the like.

In some embodiments, the control device 120 may collect an environment image of the legged robot 110 through the visual perception unit 210, and construct a conversion relationship between each pixel point in the environment image and the world coordinate system. The control device 120 determines a possible candidate landing point along a moving direction from the start moment to the end moment through the environment image and the conversion relationship.

Specifically, the control device 120 may identify an obstacle that occurs from the start moment to the end moment according to the environment image, determine a position of a non-obstacle along the moving direction from the start moment to the end moment according to the conversion relationship, and use the determined position as a candidate landing point.

Alternatively, the control device 120 collects a three-dimensional point cloud map of the environment through the visual perception unit 210, for example, the three-dimensional point cloud map may be obtained by collection when the visual perception unit 210 is a RGBD camera, or the three-dimensional point cloud map may be obtained by, for example, collecting a plurality of images of the environment in which the legged robot 110 is currently located, and reconstructing the plurality of environment images three-dimensionally. According to the three-dimensional point cloud map of the environment, a candidate plane in which the legged robot 110 may land is determined from the three-dimensional point cloud map, and specifically, a plane capable of supporting the legged robot may be determined as the candidate plane from the three-dimensional point cloud map. The control device 120 determines a candidate landing point corresponding to the foot of the legged robot from the candidate plane.

Since the legged robot 110 may land more than once in the preset period, the control device 120 may determine all possible candidate landing points of the robot in the preset period, and the all possible candidate landing points are the corresponding candidate landing points for each landing. Alternatively, in determining the candidate landing point, a possible landing region of the legged robot 110 for each landing may be determined according to a motion velocity of the legged robot 110, and the candidate landing point may be selected sequentially from the possible landing region for each landing according to any of the above methods.

For example, with continued reference to FIG. 4A, the current position of the legged robot 110 is shown in FIG. 4A, and the control device 120 respectively determines candidate landing points 430 of the foot, which include a plurality of circles on the ground shown in FIG. 4A.

S502: Determine, according to the state data at the start moment and the candidate landing point of each foot, a first correlation between a centroid position change parameter, a step duty ratio, a candidate landing point, and a foot contact force.

The first correlation is, for example, formula (14) discussed above, and the meaning of the centroid position change parameter may refer to the content discussed above, and is not repeated here.

With reference to the first correlation shown in the above formula (25), the first correlation further includes parameters such as $H_0$ and $w_k$, in addition to the centroid position change parameter, the foot contact force, the landing point and the step duty ratio. Therefore, values of these parameters may be determined by known amounts such as the state data, thereby obtaining a first correlation containing only four unknown amounts of the centroid position change parameter, the foot contact force, the landing point and the step duty ratio.

The following specifically and exemplarily introduces the method for obtaining the first correlation containing only four unknown amounts of the centroid position change parameter, the foot contact force, the landing point, and the step duty ratio by the control device 120:

The first possible method:

the control device 120 calculates a parameter such as $H_0$ corresponding to the start moment in formula (25) according to the state data at the start moment, thereby obtaining a first correlation corresponding to the start moment.

Specifically, a value of $\dot{L}$ in a $w_k$ calculation formula involved in formula (12) may be 0, and a value of w is calculated according to formula (12) according to the centroid position at the start moment. In this case, the value of w at each sampling moment is the same, and thus a value of $w_k$ at each sampling moment is the same.

Alternatively, in another case, the control device 120 may calculate $\dot{L}$ according to the given pose at the start moment and the given pose at the end moment in combination with formulas (7) to (10), thereby calculating the value of $w_k$ corresponding to the start moment. The control device 120 may calculate a value of $H_0$ according to a calculation formula of $H_0$ and the centroid position at the start moment.

The control device 120 substitutes the calculated value of $H_0$ at the start moment and the calculated value of $w_k$ at the start moment into formula (25), and represents the start moment by the step duty ratio. The specific expression may refer to the above formula (15), thereby obtaining the first correlation corresponding to the start moment.

Further, the control device 120 may represent the end moment according to the start moment and the step duty ratio, calculate a value of $H_0$ and a value of $w_k$ at the end moment according to the same method for calculating the value of $H_0$ corresponding to the start moment and the value of $w_k$ at the start moment, and obtain, according to the end moment represented by the step duty ratio, a first correlation corresponding to the end moment and containing the centroid position change parameter, the foot contact force, the step duty ratio and the landing point.

In this method, a target centroid position change parameter, a target foot contact force, a target step duty ratio, and a target landing point are determined according to the first correlation corresponding to the start moment and the first correlation corresponding to the end moment, the correlations involved are less, and the calculation amount is small.

The second possible method:

a plurality of sampling moments are obtained from the preset period, a second correlation of the time interval and the step duty ratio corresponding to each sampling moment is determined, a first correlation corresponding to each sampling moment is determined in combination with the second correlation and formula (25), and the target centroid position change parameter, the target foot contact force, the target step duty ratio and the target landing point are calculated according to the first correlation corresponding to each sampling moment.

In a process of controlling the motion of the legged robot 110, it is necessary to obtain a centroid position of the legged robot 110 at an arbitrary moment from the start moment to the end moment, but such a calculation amount is relatively large. For this reason, in the embodiment of the present disclosure, the control device 120 may obtain the centroid position at each sampling moment in the plurality of moments in the sampling period, and then determine a centroid motion trajectory of the legged robot 110 based on the centroid positions at the plurality of moments. The following describes the method for obtaining the first correlation corresponding to each sampling moment:

S1.1: Obtain a plurality of sampling moments.

The control device 120 may predict a preset period required by the legged robot according to a total length of the preset period and a motion velocity of the legged robot 110, or the control device 120 is pre-configured with the preset period required by the legged robot 110. The preset period is a duration corresponding to the sampling period. The control device 120 may determine a plurality of sampling moments from the sampling period.

After obtaining the preset period, the control device 120 may randomly sample from the preset period to obtain a plurality of sampling moments. The method for obtaining the sampling moment by randomly sampling is simpler.

Alternatively, the control device 120 samples respectively from a duration of each motion stage according to a step timing of the legged robot 110 to obtain a plurality of sampling moments. Since there is the corresponding sampling moment at each motion stage, it can be ensured that there is a corresponding sampling moment at each motion stage, which is conducive to improving the accuracy of a centroid motion trajectory determined later.

As an embodiment, a time interval between any two adjacent sampling moments may be the same, or may be different, and the latter means that the time interval between any two adjacent sampling moments is not exactly the same, or there is a case that a time interval between two adjacent sampling moments is different.

As an embodiment, the greater a quantity of sampling moments, the more reasonable the distribution of sampling moments, and the higher the reliability of the determined centroid motion trajectory. However, the more sampling moments, the greater a quantity of subsequent correlations constructed to solve the centroid position change parameter and the target landing point, and the longer the time required for solving the centroid position change parameter and target landing point, so it is extremely important to properly program a quantity of sampling points. In an embodiment of the present disclosure, the sampling moment includes at least a stage start moment and a stage end moment for each motion stage, and at least an intermediate moment in each motion stage. The intermediate moment refers to an arbitrary moment between the stage start moment and the stage end moment of the motion stage, for example, an intermediate moment between a start moment of the motion stage and an end moment of the motion stage may be selected. Alternatively, a step stage may be divided into n equal parts according to the preset period, or a sampling support stage may be divided into m equal parts to perform sampling, where n and m are positive integers.

For example, a quadrupedal walking gait of the legged robot 110 is set to a sampling period, and the control device 120 divides a motion process of the legged robot 110 in the sampling period into eight motion stages in turn, and the eight motion stages are specifically as follows: four-legged support moving centroid (simply referred to as 4S), stepping a right hind foot (simply referred to as HR), stepping a right front foot (simply referred to as FR), four-legged support moving centroid (simply referred to as 4S), four-legged support moving centroid (simply referred to as 4S), stepping a left hind foot (simply referred to as HL), stepping a left front foot (simply referred to as FL), and four-legged support moving centroid (simply referred to as 4S).

Figure 6:
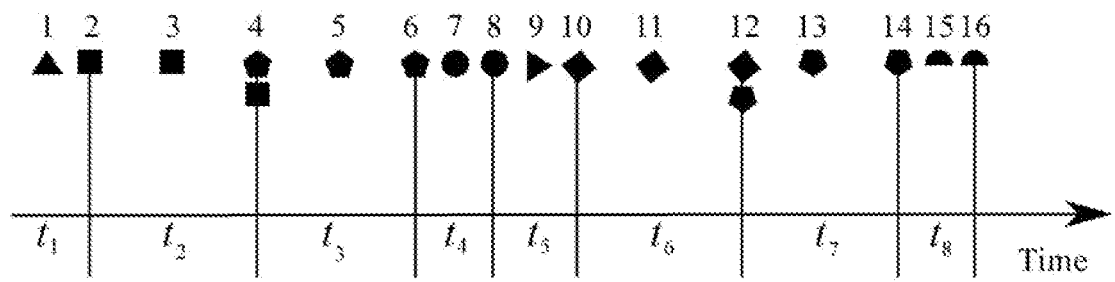
FIG. 6 is a schematic diagram of the distribution of sampling moments according to an embodiment of the present disclosure.

With reference to a schematic diagram of the distribution of the sampling moment shown in FIG. 6, a duration of each of the eight motion stages is respectively t1, t2, t3, t4, t5, t6, t7, or t8 shown in FIG. 6. For ease of description, the eight motion stages are referred to as a first motion stage, a second motion stage, and so on. The control device 120 performs sampling from each motion stage, and obtains sampling moments 1 and 2 in the first motion stage, sampling moments 2, 3, and 4 in the second motion stage, sampling moments 4, 5, and 6 in the third motion stage, and sampling moments 6, 7, and 8 in the fourth motion stage, and so on, as shown in FIG. 6, to obtain a plurality of sampling moments. In FIG. 6, sampling moments having the same shape represent sampling moments belonging to the same motion stage, and sampling moments having different shapes indicate that two sampling moments belong to two different motion stages.

Since each motion stage in a sampling period is continuous, an end moment of a certain motion stage may be regarded as both a sampling moment in the motion stage and a sampling moment in a next motion stage. For example, the sampling moment 4 shown in FIG. 6 above may be regarded as a sampling moment in both the second motion stage and the third motion stage.

S1.2: Determine a plurality of sampling moments from the preset period, and determine a second correlation between each time interval and the step duty ratio according to the plurality of sampling moments.

The control device 120 knows the start moment and the end moment, so each time interval may be represented by the step duty ratio, that is, each time interval may be represented by the second correlation of the step duty ratio, and the second correlation may specifically refer to the above formula (15). Each time interval refers to a time interval between each sampling moment and the start moment.

With reference to the above formula (15), since the specific division of the sampling moment is known, and the start moment and the end moment are known, it is possible to calculate values of $k_t$ and $b_t$ in the second correlation corresponding to each sampling moment, thereby obtaining a second correlation in which each time interval is only related to the step duty ratio.

For example, taking the legged robot completing a full step period as an example, assuming that the legged robot first steps a leg and then stays still until a next step, a total motion time is 2s and a duty ratio is d. A time of a k-th sampling point obtained by dividing the step stage into n equal parts to perform sampling is 2 kd/n, and a time of a k-th sampling point obtained by dividing the support stage into m equal parts to perform sampling is 2d+2k (1−d)/m.

S1.3: Obtain, for each sampling moment, a first correlation between the centroid position change parameter, the foot contact force, the step duty ratio, and the landing point according to a second correlation and a third correlation corresponding to the corresponding time interval.

The third correlation represents a change relationship between the foot contact force of the legged robot at each sampling moment and a centroid position, a centroid acceleration, and a candidate landing point corresponding to the sampling moment. The centroid position may represent a sum of the start centroid position and the centroid position variation. The third correlation may specifically refer to the above formula (5). The centroid acceleration in the third correlation is represented by a second derivative of the centroid position variation relative to time, and the centroid position variation is represented by the second correlation and the centroid position change parameter.

The control device 120 represents each time interval according to the step duty ratio, so the second correlation and the third correlation may be combined to obtain the first correlation between the centroid position change parameter, the foot contact force, the step duty ratio and the landing point.

Specifically, the control device 120 may calculate values of $H_0$ and $w_k$ in the above formula (25) corresponding to each sampling moment, and substitute the candidate landing point $r_{ij}$, so as to obtain the first correlation of four unknown amounts of the centroid position change parameter, the foot contact force, the step duty ratio, and the landing point. The content of the calculation of the value of $H_0$ may refer to the content discussed above, and is not repeated here.

The value of $w_k$ may be fixed, or the control device 120 determines a corresponding pose change angle of the legged robot at each sampling moment, and determines, according to the pose change angle at each sampling moment and the given pose corresponding to the start moment, a first derivative of a centroid angular momentum at each sampling moment relative to time, that is, a value of $\dot{L}$, thereby calculating the value of $w_k$ corresponding to each sampling moment.

Further, since the control device 120 obtains a step sequence of the legged robot 110 and obtains a foot that needs to land in each motion stage, values of $N_i$ and $N_c$ corresponding to each sampling moment in formula (25) may be obtained.

After determining the value of $w_k$, the value of $H_k$, and the values of $N_i$ and $N_c$ at each sampling moment, the obtained value corresponding to each sampling moment is substituted into the above formula (25), so as to obtain a first correlation between the centroid position change parameter and the foot contact force corresponding to each sampling moment. If there are a plurality of sampling moments, each sampling moment corresponds to a first correlation.

Further, in the third correlation, in addition to the centroid position, a second derivative of the centroid position relative to time is further involved. Therefore, the control device 120 may further represent a second derivative of a centroid position variation in the third correlation relative to time as a fourth correlation. The fourth correlation may specifically refer to formula (18) discussed above. The fourth correlation is obtained by solving a second derivative of a centroid position variation represented by the second correlation and the centroid position change parameter relative to time, that is, the second derivative of the centroid position variation relative to time is represented as an expression related to the step duty ratio, and then, according to the known amounts, the third correlation is further converted into the first correlation related only to the four variables of the centroid position change parameter, the foot contact force, the step duty ratio and the landing point.

With continued reference to the example shown in FIG. 6, the following is an analysis of a value of a variable involved in each motion stage:

(1) In the first 4S stage, contact positions of the four feet of the legged robot 110 with the contact surface have been determined, so it may be determined that the value of $N_i$ is 1, a quantity of $N_c$ being the landing point is 4, and the value of $r_{ij}$ corresponds to the start landing point.

(2) When the legged robot 110 is at a sampling point in the HR stage, since a right hind leg has not yet touched the ground in the air, the corresponding $N_i$ is 0, that is, it does not need to consider any constraint on the right hind leg, the quantity of $N_c$ being the landing point and the value of $r_{ij}$ are still the same as in (1).

(3) When the legged robot 110 is at a certain moment in the next FR and subsequent each stage, a right hind foot has touched the ground, and a position thereof depends on the selection of the landing point. Therefore, $N_i$ corresponding the right hind foot is not 1, and $r_{ij}$ is a candidate landing point corresponding to the right hind foot. Since a right front leg is still in the process of stepping and has not touched the ground, the corresponding $N_i$ is set to 0, and so on.

S503: Determine, under a constraint of a constraint condition set, a target centroid position change parameter, a target step duty ratio, and a target landing point satisfying the first correlation.

The constraint condition set includes one or more constraint conditions. Each constraint condition is used to constrain one or more variables in the centroid position change parameter, the landing point, the foot contact force, and the step duty ratio. The constraint condition set may specifically include one or more of the spatial landing point constraint condition, the friction force constraint condition, and the foot contact force constraint condition discussed above.

Since a unique solution cannot be obtained according to the first correlation at each sampling moment and the constraint condition set, the control device 120 may determine a plurality of sets of candidate results that satisfy the first correlation at each sampling moment and the constraint condition set. Each set of candidate results includes the centroid position change parameter, the target landing point, and the step duty ratio. If a vector formed by the step duty ratio and its power is represented as h, then a value of h is obtained in the candidate result, and the step duty ratio may be further calculated according to the value of h.

Similarly, if the target landing point is represented by the selected candidate landing point, then a value of the above $\beta_{ij}$ is obtained in the candidate result, and the control device 120 determines the corresponding target landing point according to the value of $\beta_{ij}$. There may be one or more target landing points in a set of candidate results, which is specifically related to landing times of the legged robot in the preset period. Certainly, each set of candidate results may further include a foot contact force $f_{ijk}$ corresponding to each sampling moment.

In one embodiment, the control device 120 may randomly select a set of candidate results from the plurality of sets of candidate results as a target result, that is, take a centroid position change parameter in the set of candidate results as a target centroid position change parameter, take a landing point in the candidate result as a target landing point, and determine a step duty ratio in the candidate result as a target step duty ratio.

In another possible embodiment, the control device 120 may determine, from the plurality of sets of candidate results, a candidate result corresponding to an optimized cost function, and take the candidate result corresponding to the optimized cost function as a target result.

In an embodiment, the state data at the starting moment includes a given pose at the starting moment, and the determining, according to the state data at the starting moment and the candidate landing point of each foot, a first correlation between a centroid position change parameter, a step duty ratio, a candidate landing point, and a foot contact force includes:

determining, according to the given pose at the starting moment and a given pose at an end moment in the preset period, a given pose of the legged robot at each sampling moment, and determining a pose change angle parameter of the legged robot at each sampling moment;

determining, for each sampling moment, a first derivative of a centroid angular momentum relative to time at the sampling moment according to the given pose at the sampling moment and the pose change angle parameter at the sampling moment; and determining, for each sampling moment, the first correlation according to the first derivative of the centroid angular momentum relative to time at the sampling moment and the third correlation, the third correlation representing a change relationship between the foot contact force of the legged robot at each sampling moment and a centroid position, a centroid acceleration, and the candidate landing point at the sampling moment, and the centroid position of the sampling moment being set to the sum of a start centroid position at the starting moment and a centroid position variation in a time interval corresponding to the sampling moment.

In an embodiment, the constraint condition set includes a spatial landing point constraint condition for constraining a landing point of the legged robot; and the determining, under a constraint of a constraint condition set, a target centroid position change parameter, a target step duty ratio, and a target landing point satisfying the first correlation includes:

determining, for each sampling moment, a target constraint relationship between the centroid position change parameter, the step duty ratio, and the candidate landing point at the sampling moment according to the given pose of the legged robot at the sampling moment and the spatial landing point constraint condition; and determining the target centroid position change parameter, the target step duty ratio, and the target landing point satisfying the target constraint relationship at the sampling moment and the first correlation at the sampling moment.

In an embodiment, when the constraint condition set further includes a friction force constraint condition, the target centroid position change parameter, the target step duty ratio, and the target landing point satisfy the friction force constraint condition, the friction force constraint condition being used to constrain the foot contact force at each sampling moment to be located in a friction cone, the friction cone being determined according to a normal vector of the candidate landing point and a friction coefficient between the landing foot and a contact surface; and when the constraint condition set further includes a foot contact force constraint condition, the target centroid position change parameter, the target step duty ratio, and the target landing point satisfy the contact force constraint condition, the foot contact force constraint condition being used to constrain a component of the foot contact force in a normal direction to be less than or equal to an upper limit of an acting force.

When the constraint condition set includes the spatial landing point constraint condition, the following first exemplarily introduces a process of determining the candidate result by the control device 120:

Step 1: Obtain, for each sampling moment, a target constraint relationship between the centroid position change parameter, the step duty ratio, and the candidate landing point at the sampling moment according to the given pose of the legged robot 110 at the sampling moment and the spatial landing point constraint condition.

An expression of the spatial landing point constraint condition may refer to formula (30) discussed above. In formula (30), in addition to the centroid position change parameter c, the selected candidate landing point $\beta_{ij}$, and the step duty ratio, some variables that need to be solved by the control device 120 may further be included, to be specific, such as $A_{ik}$, $B_{ik}$, $N_i$ and $b_{ik}$ in formula (30). The following exemplarily describes the method for determining these variables by the control device 120:

When a joint length of the legged robot 110 and a rotation range of the joint are known, the control device 120 may calculate values of $S_i$ and $d_i$ corresponding to the legged robot. Alternatively, when the joint length and the joint rotation range of the legged robot 110 are respectively the same as a joint length and a rotation range of an existing legged robot, the control device 120 may directly obtain pre-stored values of $S_i$ and $d_i$.

Lengths of any two legs of the legged robot 110 are the same, and a rotation range of each leg of any two legs is the same, so the values of $S_i$ and $d_i$ corresponding to each leg of the legged robot 110 are the same. If a length of one leg of the legged robot 110 is different from a length of another leg, or a rotation range of one leg of the legged robot 110 is different from a rotation range of another leg, the control device 120 may respectively determine the values of $S_i$ and $d_i$ corresponding to each leg of the legged robot 110.

Further, the control device may calculate a corresponding pose of the legged robot 110 at each sampling moment according to the given pose at the start moment and the given pose at the end moment, and then in combination with the above formulas (7) to (10). That is, a value of $R_t$ of the legged robot 110 is obtained. Then, values of $A_{ik}$, Ni, $B_{ik}$ and $b_{ik}$ corresponding to each sampling moment may be calculated in combination with formula (27) and formula (30). The known $A_{ik}$, $N_{ik}$, $B_{ik}$ and $b_{ik}$ at each sampling moment are substituted into formula (30), so as to obtain a target constraint relationship between the centroid position change parameter and the step duty ratio at each sampling moment and the candidate landing point at the corresponding sampling moment.

In a possible case, if the pose of the legged robot 110 changes less, the value of $R_t$ may also be a fixed value.

As an embodiment, when the constraint condition set further includes the friction force constraint condition, the meaning of the friction force constraint condition may refer to the content discussed above, and is not repeated here. The control device 120 may obtain a constraint relationship between the landing point and the foot contact force at each sampling moment according to the candidate landing point corresponding to each sampling moment and the friction force constraint condition. The friction force constraint condition is specifically shown in the above formula (33).

Specifically, the control device 120 may determine the candidate landing point corresponding to each sampling moment, represent $N_{ij}$ using the candidate landing point corresponding to the sampling moment, obtain $N_{ij}$ represented by $\beta_{ij}$, and then obtain a first constraint relationship between $\beta_{ij}$ corresponding to each sampling moment and the foot contact force $f_{ijk}$.

As an embodiment, when the constraint condition set further includes the contact force constraint condition, the meaning of the contact force constraint condition may refer to the content discussed above, and is not repeated here. The control device 120 may represent $n_{ij}$ in the contact force constraint condition as an expression related to $\beta_{ij}$ corresponding to the sampling moment and substitute the known upper limit of the contact force, so as to obtain a second constraint relationship between $\beta_{ij}$ at each sampling moment and the foot contact force $f_{ijk}$. The contact force constraint condition is specifically shown in the above formula (36).

For example, with continued reference to the example shown in FIG. 6:

(1) For sampling points in the first 4S stage, since initial contact positions of four feet with the ground are determined, a value of $N_i$ is 1, a value of $\beta_{ij}$ is 1, and $r_{ij}$ is an initial position of the foot.

(2) When the robot is at a sampling point in the HR stage, since a right hind leg has not yet touched the ground in the air, a value of the corresponding $N_i$ is 1, that is, it does not need to consider any constraint on the right hind leg, and the rest remains unchanged.

(3) When the robot is at a certain moment in the next FR and subsequent each stage, the right hind leg has touched the ground, and a position thereof depends on the selection of the landing point. Therefore, a value of $N_i$ corresponding the right hind foot is not 1, the corresponding $\beta_{ij}$ is set to a binary variable, and $r_{ij}$ is a candidate landing point of the right hind foot. Since a right front foot is still in the process of stepping and has not touched the ground, a value of the corresponding $N_i$ is 0, and so on.

Step 2: Determine a plurality of sets of candidate results that satisfy a first correlation at each sampling moment and a target constraint relationship at each sampling moment.

The control device 120 may determine each set of candidate results satisfying these relationships according to the first correlation at each sampling moment and the target constraint relationship at each sampling moment. The meaning of the candidate result may refer to the content discussed above, and is not repeated here.

When the constraint condition set further includes the friction force constraint condition and/or the contact force constraint condition, a plurality of sets of candidate results satisfying the first correlation at each sampling moment, the target constraint relationship at each sampling moment, a second constraint relationship at each sampling moment, and a first constraint relationship at each sampling moment are determined.

For example, each set of candidate results is to specifically satisfy each of the following correlations:

$$\begin{cases} \sum_{i=1}^{N_c} \sum_{j=1}^{N_{ik}} G_{ij} f_{ijk} = H_0 T - w_k & (38) \\ A_{ik} T_{Pk} + \sum_{j=1}^{N_{ik}} \beta_{ij} r_{ij} \le b_{ik} \\ N_{ij}^T f_{ijk} \le 0 \\ n_{ij}^T f_{ijk} \le f_i^u \beta_{ij} \\ \beta_{ij} \in \{0,1\}, \sum_{j=1}^{N_{ik}} \beta_{ij} = 1 \\ i = 1,2, \dots N_c \\ j = 1,2, \dots N_i \\ k = 1,2, \dots K \\ T_p(0) = 0, T_v(0) = v_0, T_a(0) = a_0 \\ h = \begin{bmatrix} d \\ \vdots \\ d^n \end{bmatrix} \end{cases}$$

K represents any selected sampling moment, and the meanings of other letters in the above formula may refer to the content discussed above, and is not repeated here. $T_p(0)$ represents the centroid position variation corresponding to the start moment, $T_v(0)$ represents the centroid velocity corresponding to the start moment, and $T_a(0)$ represents the centroid acceleration corresponding to the start moment.

Since the above involved correlations are still less than a quantity of unknown amounts to be solved, there are a plurality of sets of candidate results satisfying the above correlation, and after obtaining the plurality of sets of candidate results, the control device 120 may arbitrarily select one set as the target result; or minimize the cost function to obtain the target result.

Specifically, after obtaining the plurality of sets of candidate results, the control device 120 may determine a value of the cost function corresponding to each set of candidate results, and determine a candidate result corresponding to the cost function having a smallest value as the target result. The specific form of the cost function may refer to the content discussed above, and is not repeated here.

In an embodiment, the determining, according to each set of candidate results in the plurality of sets of candidate results, a value of a cost function for each set of candidate results includes:

determining weights of, according to each set of candidate results, a sum of squares of the foot contact force in the preset period, a sum of squares of the centroid position variation in the preset period, and a sum of squares of a difference between first centroid state data at the end moment in the preset period and corresponding target centroid state data, the first centroid state data being determined according to the step duty ratio and the centroid position change parameter in the candidate result, and the target centroid state data being determined according to the landing point in the candidate result.

Taking the cost function being formula (37) discussed above as an example, the following introduces the obtaining of the value of the cost function corresponding to a set of candidate results by the control device 120:

(1) The control device 120 determines a weighted sum of squares of each foot contact force according to the foot contact force corresponding to each sampling moment in a set of candidate results, thereby obtaining a value of $J_{grf}$ in the cost function shown in formula (37). The weighted weights corresponding to any two foot contact forces may be the same or may be different.

(2) The control device 120 determines a weighted sum of squares of a difference between the centroid position variations at every two adjacent sampling moments in the plurality of sampling moments, thereby obtaining a value of $J_{len}$ in the cost function shown in formula (37). The weighted weights of any two centroid position variations may be the same or may be different.

(3) The control device 120 determines a weighted sum of squares of a difference between the first centroid position and the target centroid position at the end moment in the preset period, a difference between the first centroid velocity and the target centroid velocity at the end moment in the preset period, and a difference between the first centroid acceleration and the target centroid acceleration at the end moment in the preset period, thereby obtaining a value of $J_{tgt}$ in the cost function shown in formula (37).

After obtaining the value of $J_{grf}$, the value of $J_{len}$, and the value of $J_{tgt}$ in the cost function shown in formula (37), the control device 120 determines a sum of the value of $J_{grf}$, the value of $J_{len}$, and the value of $J_{tgt}$, thereby obtaining a value of the cost function corresponding to the candidate result.

By analogy, the value of the cost function corresponding to each set of candidate results of the control device 120 may be obtained, thereby determining a candidate result corresponding to the cost function having the smallest value as the target result.

S504: Control, according to the target centroid position change parameter, the target landing point, and the target step duty ratio, motion of the legged robot in the preset period.

In the control process, the control device 120 may control the corresponding joint of the legged robot 110 to implement the lifting and lowering of each foot of the legged robot, thereby driving the legged robot 110 to move along a moving path. Specifically, the control device 120 controls a joint torque of the corresponding joint of the legged robot 110 to cause at least one foot of the legged robot to support the movement of the legged robot, and to cause a true centroid position of the legged robot to be as far as possible maintained at the centroid position determined above. Therefore, after obtaining the target centroid position change parameter, the target landing point, and the target step duty ratio, the control device 120 needs to first determine a target motion control parameter.

The following exemplarily describes the method for determining the target motion control parameter by the control device 120:

After obtaining the target result, the control device 120 obtains the target centroid position change parameter, the target step duty ratio, and the target landing point. Therefore, the control device 120 may obtain the first centroid position corresponding to any moment according to the start centroid position, the centroid position change parameter, and the target step duty ratio. The specific calculation formula involved may refer to the above formula (4) and formula (15).

Figure 7:
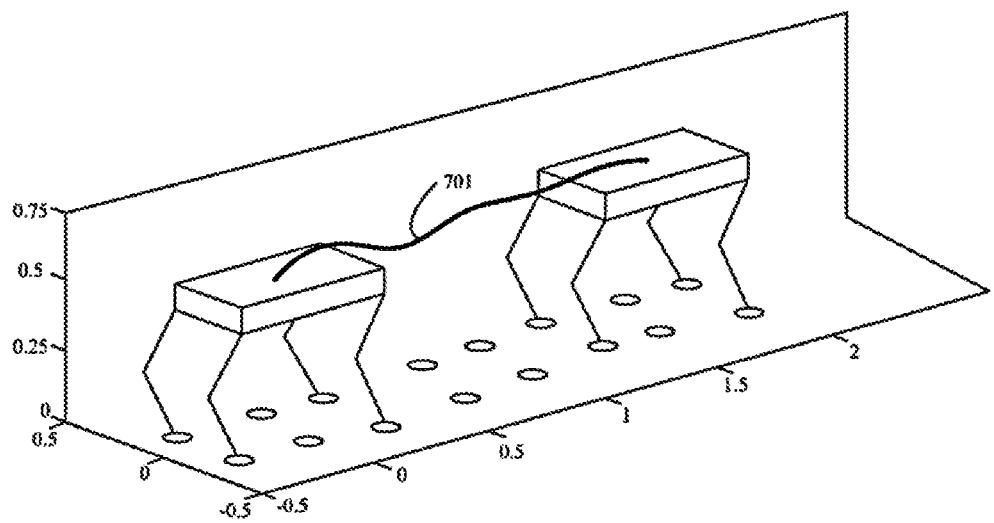
FIG. 7 is an example diagram of a motion process of a legged robot according to an embodiment of the present disclosure.

For example, with reference to FIG. 7, which is an example diagram of the motion process of the legged robot 110, the centroid motion trajectory of the legged robot may be shown as 701 in FIG. 7. From FIG. 7, it can be seen that the centroid position of the legged robot 110 varies continuously over time with less fluctuation.

In an embodiment, the controlling, according to the target centroid position change parameter, the target step duty ratio, and the target landing point, motion of the legged robot in the preset period includes:

determining, according to the target centroid position change parameter, the target step duty ratio, and the target landing point, a target motion control parameter of the legged robot; and controlling, according to the target motion control parameter of the legged robot, motion of the legged robot in the preset period.

In an embodiment, the determining, according to the target centroid position change parameter, the target step duty ratio, and the target landing point, a target motion control parameter of the legged robot includes:

the control device 120 determining, according to the target centroid position change parameter, a first centroid position of the legged robot at each sampling moment, and determining, according to a start landing point, the target landing point, and the target step duty ratio at the starting moment, a target foot position of the legged robot at each sampling moment in the preset period.

Specifically, the control device 120 determines the corresponding foot of the legged robot 110 that needs to land at each motion stage according to the obtained target landing point at each sampling moment and the target step duty ratio, and performs interpolation on the start landing point and the target landing point, thereby obtaining the corresponding target foot position of the legged robot 110 at each sampling moment.

The control device 120 determines a target pose of the legged robot at each sampling moment according to the given pose at the start moment and a target pose of the legged robot 110 at the end moment. Specifically, a target pose change angle corresponding to each sampling moment is calculated, so as to calculate the corresponding target pose of the legged robot 110 at each sampling moment according to the target pose change angle corresponding to each sampling moment. The specific calculation formula may refer to the above formula (7) to formula (10), where the target pose at the end moment may be determined according to the landing point of the legged robot 110 at the end moment.

Further, the control device 120 performs, for each sampling moment, an inverse kinematic operation on the first centroid position of the legged robot at the sampling moment, the target pose at the sampling moment, and the target foot position at the sampling moment, to determine a target joint rotation angle of the legged robot at the sampling moment. The target joint rotation angle is differentiated to obtain a target angle velocity corresponding to each sampling moment.

The control device 120 determines, for each sampling moment, a joint torque of the legged robot at each sampling moment according to the target joint rotation angle at the sampling moment and an actual joint angle at the sampling moment.

Specifically, the control device 120 determines the joint torque of the legged robot at the corresponding moment through a robot dynamic control method according to the target joint rotation angle and the target angle velocity at each sampling moment, and the actual joint angle and an actual angle velocity at the corresponding moment, to obtain the target motion control parameter.

For example, the control device 120 determines a target foot contact force according to the target pose, the target centroid position, an actual pose and an actual centroid position, and multiplies the optimized foot contact force by the transposition corresponding to a Jacobian matrix to convert the foot contact force to a joint, thereby obtaining a feed-forward torque. Then, a feedback torque is calculated by using independent joint control according to the target joint rotation angle and the actual joint angle of the joint. Finally, a sum of the feed-forward torque and the feedback torque is limited, and a final torque control signal for controlling the legged robot 110 is obtained, and then the motion of the legged robot 110 is controlled according to the torque control signal.

As an embodiment, steps of S501 to S504 may be executed by the trajectory generation unit 220, or the visual perception unit 210 executes the step of S501, the trajectory generation unit 220 executes the steps of S502 and S503, and a trajectory control unit 230 executes the step of S504.

In the embodiment of the present disclosure, in the process of controlling the motion of the legged robot 110, the step duty ratio, the centroid position, and the landing point are determined according to an actual motion process of the legged robot 110. That is, before the motion of the legged robot 110, the programmed motion control parameter of the legged robot 110 can be more in line with the actual motion process of the legged robot. Moreover, since it is not necessary to set the step duty ratio, the centroid position, the landing point and the like of the legged robot 110, the intelligence degree of the motion of the legged robot 110 is improved.

Figure 8:
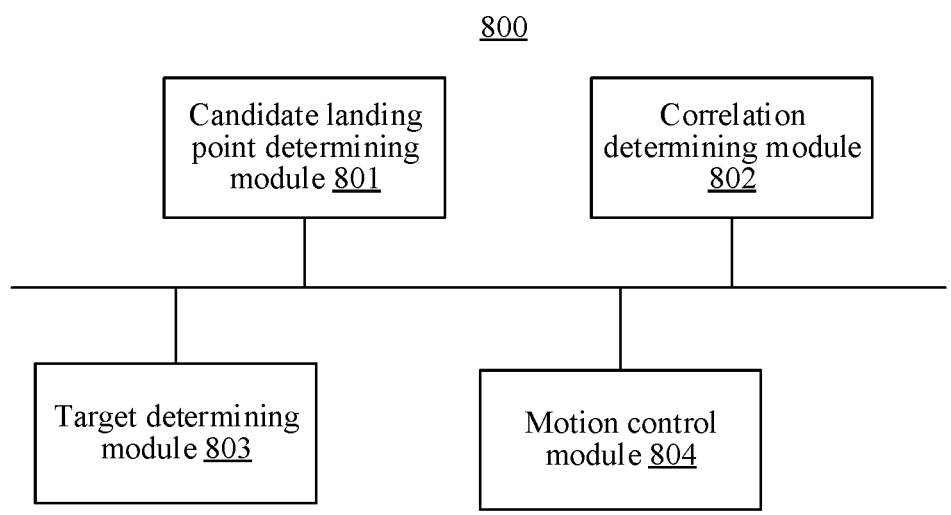
FIG. 8 is a schematic structural diagram of an apparatus for controlling motion of a legged robot according to an embodiment of the present disclosure.

Based on the same inventive concept, an embodiment of the present disclosure provides an apparatus for controlling motion of a legged robot, which is equivalent to being arranged in the control device 120 discussed above. With reference to FIG. 8, the legged robot includes a plurality of feet, and the apparatus 800 for controlling motion of a legged robot includes:

a candidate landing point determining module 801, configured to determine, according to state data of the legged robot at a starting moment in a preset period, a candidate landing point of each foot in the preset period;

a correlation determining module 802, configured to determine, according to the state data at the starting moment and the candidate landing point of each foot, a first correlation between a centroid position change parameter, a step duty ratio, a candidate landing point, and a foot contact force;

a target determining module 803, configured to determine, under a constraint of a constraint condition set, a target centroid position change parameter, a target step duty ratio, and a target landing point satisfying the first correlation; and a motion control module 804, configured to control, according to the target centroid position change parameter, the target step duty ratio, and the target landing point, motion of the legged robot in the preset period.

In one embodiment, the correlation determining module 802 is specifically configured to:

determine a plurality of sampling moments from the preset period;

determine, according to the plurality of sampling moments, a second correlation between each time interval and the step duty ratio, the each time interval referring to a time interval between each sampling moment and the starting moment; and obtain, for each sampling moment, the first correlation according to a third correlation and the second correlation of a time interval corresponding to the sampling moment, the third correlation representing a change relationship between the foot contact force of the legged robot at each sampling moment and a centroid position, a centroid acceleration, and the candidate landing point corresponding to the sampling moment, and the centroid position of the sampling moment being set to the sum of a start centroid position at the starting moment and a centroid position variation in a time interval corresponding to the sampling moment.

In one embodiment, the centroid acceleration in the third correlation is represented by a second derivative of the centroid position variation relative to time, and the centroid position variation is represented by the second correlation and the centroid position change parameter.

In one embodiment, state data at a start moment includes a given pose at the start moment, and the correlation determining module 802 is specifically configured to:

determine, according to the given pose at the starting moment and a given pose at an end moment in the preset period, a given pose of the legged robot at each sampling moment, and determine a pose change angle parameter of the legged robot at each sampling moment;

determine, for each sampling moment, a first derivative of a centroid angular momentum relative to time at the sampling moment according to the given pose at the sampling moment and the pose change angle parameter at the sampling moment; and determine, for each sampling moment, the first correlation according to the first derivative of the centroid angular momentum relative to time at the sampling moment and the third correlation, the third correlation representing a change relationship between the foot contact force of the legged robot at each sampling moment and a centroid position, a centroid acceleration, and the candidate landing point at the sampling moment, and the centroid position of the sampling moment being set to the sum of a start centroid position at the starting moment and a centroid position variation in a time interval corresponding to the sampling moment.

In one embodiment, a constraint condition set includes a spatial landing point constraint condition for constraining a landing point of the legged robot, and the target determining module 803 is specifically configured to:

determine, for each sampling moment, a target constraint relationship between the centroid position change parameter, the step duty ratio, and the candidate landing point at the sampling moment according to the given pose of the legged robot at the sampling moment and the spatial landing point constraint condition; and determine the target centroid position change parameter, the target step duty ratio, and the target landing point satisfying the target constraint relationship at the sampling moment and the first correlation at the sampling moment.

In one embodiment, when the constraint condition set further includes a friction force constraint condition, the target centroid position change parameter, the target step duty ratio, and the target landing point satisfy the friction force constraint condition, the friction force constraint condition being used to constrain the foot contact force at each sampling moment to be located in a friction cone, the friction cone being determined according to a normal vector of the candidate landing point and a friction coefficient between the landing foot and a contact surface; and when the constraint condition set further includes a foot contact force constraint condition, the target centroid position change parameter, the target step duty ratio, and the target landing point satisfy the contact force constraint condition, the foot contact force constraint condition being used to constrain a component of the foot contact force in a normal direction to be less than or equal to an upper limit of an acting force.

In one embodiment, the target determining module 803 is specifically configured to:

obtain a plurality of sets of candidate results that satisfy the first correlation and the constraint condition set, each set of candidate results including the centroid position change parameter, the step duty ratio, and the landing point;

determine, according to each set of candidate results in the plurality of sets of candidate results, a value of a cost function for each set of candidate results, the cost function being a quadratic term constructed according to a correlation amount contained in the candidate result; and determine a set of candidate results corresponding to a cost function having a minimum value as a target result, the target result including the target centroid position change parameter, the step duty ratio, and the target landing point.

In one embodiment, the target determining module 803 is specifically configured to:

weight, according to each set of candidate results, a sum of squares of the foot contact force in the preset period, a sum of squares of the centroid position variation in the preset period, and a sum of squares of a difference between first centroid state data at the end moment in the preset period and corresponding target centroid state data, the first centroid state data being determined according to the step duty ratio and the centroid position change parameter in the candidate result, and the target centroid state data being determined according to the landing point in the candidate result.

In one embodiment, the motion control module 804 is specifically configured to:

determine, according to the target centroid position change parameter, the target step duty ratio, and the target landing point, a target motion control parameter of the legged robot; and control, according to the target motion control parameter of the legged robot, motion of the legged robot in the preset period.

In one embodiment, the motion control module 804 is specifically configured to:

determine, according to the target centroid position change parameter, a first centroid position of the legged robot at each sampling moment, and determining, according to a start landing point, the target landing point, and the target step duty ratio at the starting moment, a target foot position of the legged robot at each sampling moment in the preset period;

determine, according to the given pose at the starting moment and a target pose of the legged robot at an end moment, a target pose of the legged robot at each sampling moment;

perform, for each sampling moment, an inverse kinematic operation on the first centroid position of the legged robot at the sampling moment, the target pose at the sampling moment, and the target foot position at the sampling moment, to determine a target joint rotation angle of the legged robot at the sampling moment; and determine, for each sampling moment, a joint torque of the legged robot at each sampling moment according to the target joint rotation angle at the sampling moment and an actual joint angle at the sampling moment.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Based on the same inventive concept, an embodiment of the present disclosure further provides an electronic device. The legged robot can be used to implement the functions of the legged robot 110 discussed above, or can be used to implement the functions of the control device 120 discussed above.

Figure 9:
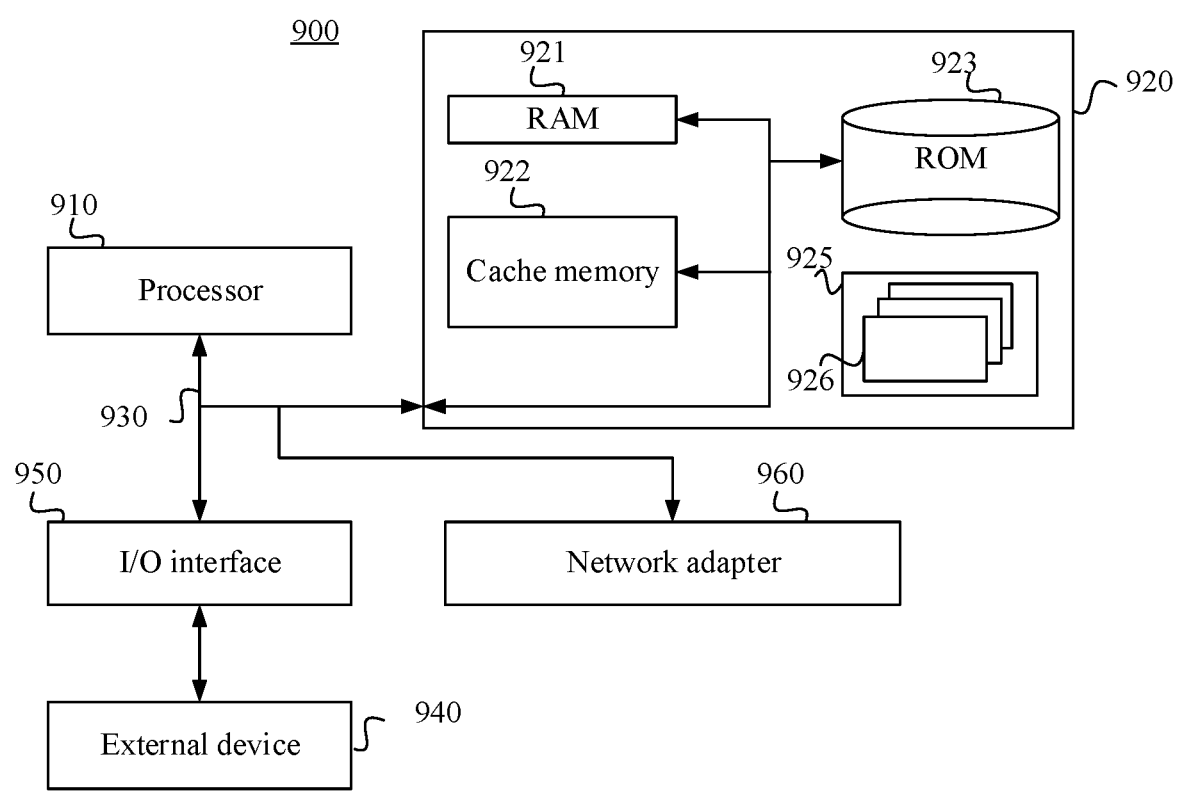
FIG. 9 is a schematic structural diagram of an electronic device according to an embodiment of the present disclosure.

With reference to FIG. 9, an electronic device 900 is represented in the form of a general-purpose computer device. Components of the electronic device 900 may include, but are not limited to: at least one processor 910, at least one memory 920, and a bus 930 connected to different system components (including the processor 910 and the memory 920).

The bus 930 represents one or more of several types of bus structures, including a memory bus or a memory controller, a peripheral bus, a processor, or a local bus using any bus structure among various bus structures.

The memory 920 may include a readable medium in the form of a volatile memory, such as a random access memory (RAM) 921 and/or a cache memory 922, and may further include a read-only memory (ROM) 923. The memory 920 may further include a program/utility 926 having a set of (at least one) program modules 925. Such program modules 925 include, but are not limited to, an operating system, one or more application programs, other program modules, and program data. Each of such examples or a combination thereof may include an implementation of a network environment. The processor 910 is used to execute program instructions stored in the memory 920 and the like to implement the method for controlling motion of a legged robot discussed above.

The electronic device 900 may communicate with one or more external devices 940 (such as a keyboard and a pointing device), and may also communicate with one or more devices that enable a terminal to interact with the electronic device 900, and/or communicate with any device (such as a router or a modem) that enables the electronic device 900 to communicate with one or more other devices. This communication may proceed through an input/output (I/O) interface 950. In addition, the electronic device 900 may further communicate with one or more networks (such as a local area network (LAN), a wide area network (WAN), and/or a public network (such as the Internet)) through a network adapter 960. As shown in the drawing, the network adapter 960 communicates with other modules of the electronic device 900 through the bus 930. It is to be understood that although not shown in the drawing, other hardware and/or software modules may be used in combination with the electronic device 900, including, but not limited to, microcode, a device driver, a redundancy processing unit, an external magnetic disk driving array, a RAID system, a magnetic tape drive, a data backup storage system, and the like.

Based on the same inventive concept, an embodiment of the present disclosure provides a storage medium, and the storage medium stores computer instructions, the computer instruction, when run on a computer, causing a computer to execute the method for controlling motion of a legged robot discussed above.

Based on the same inventive concept, an embodiment of the present disclosure provides a computer program product, the computer program product including computer instructions, the computer instructions being stored in a computer-readable storage medium. The processor of the computer device reads the computer instructions from the computer-readable storage medium, and the processor executes the computer instructions, to cause the computer device to perform any of the above methods for controlling motion of a legged robot.

A person skilled in the art is to understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product that is implemented on one or more computer-usable storage media (including but not limited to a disk memory, a CD-ROM, an optical memory, and the like) that include computer-usable program code.

Obviously, a person skilled in the art can make various modifications and variations to the present disclosure without departing from the spirit and scope of the present disclosure. In this case, if the modifications and variations made to the present disclosure fall within the scope of the claims of the present disclosure and their equivalent technologies, the present disclosure is intended to include these modifications and variations.

What is claimed is:

1. A method for controlling motion of a legged robot, executed by an electronic device, the legged robot comprising a plurality of feet, the method comprising:

determining, according to state data of the legged robot at a start moment in a preset period, a candidate landing point of each foot in the preset period;

determining a plurality of sampling moments from the preset period;

determining, according to the plurality of sampling moments, a second correlation between each time interval and a step duty ratio, the each time interval referring to a time interval between each sampling moment and the start moment;

determining, according to the state data at the start moment and the candidate landing point of each foot, a third correlation representing a change relationship between a foot contact force of the legged robot at each sampling moment and a centroid position, a centroid acceleration, and the candidate landing point corresponding to the sampling moment, wherein the centroid position of the sampling moment is set based on a sum of a start centroid position at the start moment and a centroid position variation in a time interval corresponding to the sampling moment;

determining, for each sampling moment, according to the third correlation and the second correlation of a time interval corresponding to the sampling moment, a first correlation between a centroid position change parameter, the step duty ratio, a candidate landing point, and a foot contact force;

determining, under a constraint of a constraint condition set, a target centroid position change parameter, a target step duty ratio, and a target landing point satisfying the first correlation; and controlling, according to the target centroid position change parameter, the target step duty ratio, and the target landing point, motion of the legged robot in the preset period.

2. The method according to claim 1, wherein the centroid acceleration in the third correlation is represented by a second derivative of the centroid position variation relative to time, and the centroid position variation is represented by the second correlation and the centroid position change parameter.

3. The method according to claim 1, wherein the state data at the start moment comprises a given pose at the start moment, and the determining, according to the state data at the start moment and the candidate landing point of each foot, a first correlation between a centroid position change parameter, a step duty ratio, a candidate landing point, and a foot contact force comprises:

determining, according to the given pose at the start moment and a given pose at an end moment in the preset period, a given pose of the legged robot at each sampling moment, and determining a pose change angle parameter of the legged robot at each sampling moment;

determining, for each sampling moment, a first derivative of a centroid angular momentum relative to time at the sampling moment according to the given pose at the sampling moment and the pose change angle parameter at the sampling moment; and determining, for each sampling moment, the first correlation according to the first derivative of the centroid angular momentum relative to time at the sampling moment and the third correlation, the third correlation representing a change relationship between the foot contact force of the legged robot at each sampling moment and a centroid position, a centroid acceleration, and the candidate landing point at the sampling moment, and the centroid position of the sampling moment being set to the sum of a start centroid position at the start moment and a centroid position variation in a time interval corresponding to the sampling moment.

4. The method according to claim 3, wherein the constraint condition set comprises a spatial landing point constraint condition for constraining a landing point of the legged robot; and the determining, under a constraint of a constraint condition set, a target centroid position change parameter, a target step duty ratio, and a target landing point satisfying the first correlation comprises:

determining, for each sampling moment, a target constraint relationship between the centroid position change parameter, the step duty ratio, and the candidate landing point at the sampling moment according to the given pose of the legged robot at the sampling moment and the spatial landing point constraint condition; and determining the target centroid position change parameter, the target step duty ratio, and the target landing point satisfying the target constraint relationship at the sampling moment and the first correlation at the sampling moment.

5. The method according to claim 4, wherein when the constraint condition set further comprises a friction force constraint condition, the target centroid position change parameter, the target step duty ratio, and the target landing point satisfy the friction force constraint condition, the friction force constraint condition being used to constrain the foot contact force at each sampling moment to be located in a friction cone, the friction cone being determined according to a normal vector of the candidate landing point and a friction coefficient between the foot that is going to land on a contact surface and the contact surface; and when the constraint condition set further comprises a foot contact force constraint condition, the target centroid position change parameter, the target step duty ratio, and the target landing point satisfy the contact force constraint condition, the foot contact force constraint condition being used to constrain a component of the foot contact force in a normal direction to be less than or equal to an upper limit of an acting force.

6. The method according to claim 1, wherein the determining, under a constraint of a constraint condition set, a target centroid position change parameter, a target step duty ratio, and a target landing point satisfying the first correlation comprises:

obtaining a plurality of sets of candidate results that satisfy the first correlation and the constraint condition set, each set of candidate results comprising the centroid position change parameter, the step duty ratio, and the landing point;

determining, according to each set of candidate results in the plurality of sets of candidate results, a value of a cost function for each set of candidate results, the cost function being a quadratic term constructed according to a correlation amount contained in the candidate result; and determining a set of candidate results corresponding to a cost function having a minimum value as a target result, the target result comprising the target centroid position change parameter, the target step duty ratio, and the target landing point.

7. The method according to claim 6, wherein the determining, according to each set of candidate results in the plurality of sets of candidate results, a value of a cost function for each set of candidate results comprises:

determining weights of, according to each set of candidate results, a sum of squares of the foot contact force in the preset period, a sum of squares of the centroid position variation in the preset period, and a sum of squares of a difference between first centroid state data at the end moment in the preset period and corresponding target centroid state data, the first centroid state data being determined according to the step duty ratio and the centroid position change parameter in the candidate result, and the target centroid state data being determined according to the landing point in the candidate result.

8. The method according to claim 1, wherein the controlling, according to the target centroid position change parameter, the target step duty ratio, and the target landing point, motion of the legged robot in the preset period comprises:

determining, according to the target centroid position change parameter, the target step duty ratio, and the target landing point, a target motion control parameter of the legged robot; and controlling, according to the target motion control parameter of the legged robot, motion of the legged robot in the preset period.

9. The method according to claim 8, wherein the determining, according to the target centroid position change parameter, the target step duty ratio, and the target landing point, a target motion control parameter of the legged robot comprises:

determining, according to the target centroid position change parameter, a first centroid position of the legged robot at each sampling moment, and determining, according to a start landing point at the start moment, the target landing point, and the target step duty ratio, a target foot position of the legged robot at each sampling moment in the preset period;

determining, according to the given pose at the start moment and a target pose of the legged robot at an end moment, a target pose of the legged robot at each sampling moment;

performing, for each sampling moment, an inverse kinematic operation on the first centroid position of the legged robot at the sampling moment, the target pose at the sampling moment, and the target foot position at the sampling moment, to determine a target joint rotation angle of the legged robot at the sampling moment; and determining, for each sampling moment, a joint torque of the legged robot at each sampling moment according to the target joint rotation angle at the sampling moment and an actual joint angle at the sampling moment.

10. An apparatus for controlling motion of a legged robot, the legged robot comprising a plurality of feet, the apparatus comprising:

a memory; and at least one processor, coupled to the memory, the memory storing instructions executable by the at least one processor, and the at least one processor, by executing the instructions stored in the memory, implementing:

determining, according to state data of the legged robot at a start moment in a preset period, a candidate landing point of each foot in the preset period;

determining a plurality of sampling moments from the preset period;

determining, according to the plurality of sampling moments, a second correlation between each time interval and a step duty ratio, the each time interval referring to a time interval between each sampling moment and the start moment;

determining, according to the state data at the start moment and the candidate landing point of each foot, a third correlation representing a change relationship between a foot contact force of the legged robot at each sampling moment and a centroid position, a centroid acceleration, and the candidate landing point corresponding to the sampling moment, wherein the centroid position of the sampling moment is set based on a sum of a start centroid position at the start moment and a centroid position variation in a time interval corresponding to the sampling moment;

determining, for each sampling moment, according to the third correlation and the second correlation of a time interval corresponding to the sampling moment, a first correlation between a centroid position change parameter, the step duty ratio, a candidate landing point, and a foot contact force;

determining, under a constraint of a constraint condition set, a target centroid position change parameter, a target step duty ratio, and a target landing point satisfying the first correlation; and controlling, according to the target centroid position change parameter, the target step duty ratio, and the target landing point, motion of the legged robot in the preset period.

11. The apparatus according to claim 10, wherein the centroid acceleration in the third correlation is represented by a second derivative of the centroid position variation relative to time, and the centroid position variation is represented by the second correlation and the centroid position change parameter.

12. The apparatus according to claim 10, wherein the state data at the start moment comprises a given pose at the start moment, and the determining, according to the state data at the start moment and the candidate landing point of each foot, a first correlation between a centroid position change parameter, a step duty ratio, a candidate landing point, and a foot contact force comprises:

determining, according to the given pose at the start moment and a given pose at an end moment in the preset period, a given pose of the legged robot at each sampling moment, and determining a pose change angle parameter of the legged robot at each sampling moment;

determining, for each sampling moment, a first derivative of a centroid angular momentum relative to time at the sampling moment according to the given pose at the sampling moment and the pose change angle parameter at the sampling moment; and determining, for each sampling moment, the first correlation according to the first derivative of the centroid angular momentum relative to time at the sampling moment and the third correlation, the third correlation representing a change relationship between the foot contact force of the legged robot at each sampling moment and a centroid position, a centroid acceleration, and the candidate landing point at the sampling moment, and the centroid position of the sampling moment being set to the sum of a start centroid position at the start moment and a centroid position variation in a time interval corresponding to the sampling moment.

13. The apparatus according to claim 12, wherein the constraint condition set comprises a spatial landing point constraint condition for constraining a landing point of the legged robot; and the determining, under a constraint of a constraint condition set, a target centroid position change parameter, a target step duty ratio, and a target landing point satisfying the first correlation comprises:

determining, for each sampling moment, a target constraint relationship between the centroid position change parameter, the step duty ratio, and the candidate landing point at the sampling moment according to the given pose of the legged robot at the sampling moment and the spatial landing point constraint condition; and determining the target centroid position change parameter, the target step duty ratio, and the target landing point satisfying the target constraint relationship at the sampling moment and the first correlation at the sampling moment.

14. The apparatus according to claim 13, wherein when the constraint condition set further comprises a friction force constraint condition, the target centroid position change parameter, the target step duty ratio, and the target landing point satisfy the friction force constraint condition, the friction force constraint condition being used to constrain the foot contact force at each sampling moment to be located in a friction cone, the friction cone being determined according to a normal vector of the candidate landing point and a friction coefficient between the foot that is going to land on a contact surface and the contact surface; and when the constraint condition set further comprises a foot contact force constraint condition, the target centroid position change parameter, the target step duty ratio, and the target landing point satisfy the contact force constraint condition, the foot contact force constraint condition being used to constrain a component of the foot contact force in a normal direction to be less than or equal to an upper limit of an acting force.

15. The apparatus according to claim 10, wherein the determining, under a constraint of a constraint condition set, a target centroid position change parameter, a target step duty ratio, and a target landing point satisfying the first correlation comprises:

obtaining a plurality of sets of candidate results that satisfy the first correlation and the constraint condition set, each set of candidate results comprising the centroid position change parameter, the step duty ratio, and the landing point;

determining, according to each set of candidate results in the plurality of sets of candidate results, a value of a cost function for each set of candidate results, the cost function being a quadratic term constructed according to a correlation amount contained in the candidate result; and determining a set of candidate results corresponding to a cost function having a minimum value as a target result, the target result comprising the target centroid position change parameter, the target step duty ratio, and the target landing point.

16. The apparatus according to claim 15, wherein the determining, according to each set of candidate results in the plurality of sets of candidate results, a value of a cost function for each set of candidate results comprises:

determining weights of, according to each set of candidate results, a sum of squares of the foot contact force in the preset period, a sum of squares of the centroid position variation in the preset period, and a sum of squares of a difference between first centroid state data at the end moment in the preset period and corresponding target centroid state data, the first centroid state data being determined according to the step duty ratio and the centroid position change parameter in the candidate result, and the target centroid state data being determined according to the landing point in the candidate result.

17. The apparatus according to claim 10, wherein the controlling, according to the target centroid position change parameter, the target step duty ratio, and the target landing point, motion of the legged robot in the preset period comprises:

determining, according to the target centroid position change parameter, the target step duty ratio, and the target landing point, a target motion control parameter of the legged robot; and controlling, according to the target motion control parameter of the legged robot, motion of the legged robot in the preset period.

18. A non-transitory storage medium, storing computer instructions, the computer instructions, when run on a computer, causing the computer to execute:

determining, according to state data of the legged robot at a start moment in a preset period, a candidate landing point of each foot in the preset period;

determining a plurality of sampling moments from the preset period;

determining, according to the plurality of sampling moments, a second correlation between each time interval and a step duty ratio, the each time interval referring to a time interval between each sampling moment and the start moment;

determining, according to the state data at the start moment and the candidate landing point of each foot, a third correlation representing a change relationship between a foot contact force of the legged robot at each sampling moment and a centroid position, a centroid acceleration, and the candidate landing point corresponding to the sampling moment, wherein the centroid position of the sampling moment is set based on a sum of a start centroid position at the start moment and a centroid position variation in a time interval corresponding to the sampling moment;

determining, for each sampling moment, according to the third correlation and the second correlation of a time interval corresponding to the sampling moment, a first correlation between a centroid position change parameter, the step duty ratio, a candidate landing point, and a foot contact force;

determining, under a constraint of a constraint condition set, a target centroid position change parameter, a target step duty ratio, and a target landing point satisfying the first correlation; and controlling, according to the target centroid position change parameter, the target step duty ratio, and the target landing point, motion of the legged robot in the preset period.

* * * * *